US012681881B2

(12) United States Patent
Ghosh Dastidar et al.

(10) Patent No.: US 12,681,881 B2
(45) Date of Patent: Jul. 14, 2026

(54) AUTARCHICAL POWER DOMAINS FOR EXECUTING MINIMAL RISK CONDITIONS

(71) Applicant: Applied Intuition, Inc., Mountain View, CA (US)

(72) Inventors: Arpita Ghosh Dastidar, Mountain View, CA (US); Riaz Ali, Mountain View, CA (US); Par Botes, Atherton, CA (US)

(73) Assignee: Applied Intuition, Inc., Sunnyvale, CA (US)

( * ) Notice: Subject to any disclaimer, the term of this patent is extended or adjusted under 35 U.S.C. 154(b) by 114 days.

(21) Appl. No.: 18/295,790

(22) Filed: Apr. 4, 2023

(65) Prior Publication Data
US 2024/0338331 A1    Oct. 10, 2024

(51) Int. Cl.
G06F 13/40       (2006.01)
G06F 13/38       (2006.01)
G06F 13/42       (2006.01)

(52) U.S. Cl.
CPC ........ G06F 13/4022 (2013.01); G06F 13/385 (2013.01); G06F 13/4282 (2013.01)

(58) Field of Classification Search
None
See application file for complete search history.

(56) References Cited

U.S. PATENT DOCUMENTS

| | | | | |
|---|---|---|---|---|
| 7,954,023 | B2 * | 5/2011 | Otsuga | H03K 19/0016 |
| | | | | 714/726 |
| 8,644,103 | B2 * | 2/2014 | Ma | G11C 7/02 |
| | | | | 365/228 |
| 11,764,575 | B2 * | 9/2023 | Park | H02J 1/082 |
| | | | | 307/9.1 |
| 12,249,859 | B2 * | 3/2025 | Paparrizos | H02J 7/933 |
| 2014/0198586 | A1 * | 7/2014 | Tanzawa | G11C 7/1093 |
| | | | | 365/191 |
| 2015/0333517 | A1 * | 11/2015 | Paquin | H02J 3/144 |
| | | | | 700/286 |
| 2017/0005828 | A1 * | 1/2017 | Gino | H04L 12/40039 |
| 2017/0052586 | A1 * | 2/2017 | Nejedlo | G06F 1/28 |
| 2019/0097736 | A1 * | 3/2019 | Ho | H04B 10/80 |
| 2020/0393891 | A1 * | 12/2020 | Baggett | G06F 1/3234 |
| 2021/0129772 | A1 * | 5/2021 | Shi | G06F 13/4072 |
| 2021/0255678 | A1 * | 8/2021 | Wong | G06F 1/28 |
| 2021/0376643 | A1 * | 12/2021 | Paparrizos | H02J 7/0047 |
| 2023/0009818 | A1 * | 1/2023 | Park | H02J 1/082 |
| 2024/0085970 | A1 * | 3/2024 | Popovic | G06F 1/3243 |
| 2024/0303216 | A1 * | 9/2024 | Gupta | G06F 5/06 |

* cited by examiner

*Primary Examiner* — Henry Tsai
*Assistant Examiner* — Aurangzeb Hassan
(74) *Attorney, Agent, or Firm* — McDermott Will & Schulte LLP

(57) ABSTRACT
A system includes a power supply and a plurality of buses coupled to the power supply. A bus selector is coupled to an output of each of the plurality of buses. A power storage unit that is separate from the power supply is coupled to an output of the power supply via the bus selector. A power controller is coupled to an output of the bus selector and to an output of the power storage unit. The power controller selects a power output as the output of the power supply or the output of the power storage unit.

41 Claims, 13 Drawing Sheets

Select Bus from Power Supply
1105

Select Power Output from Selected Bus and Power
Storage Unit
1110

Couple Power Output to First Power Doman and to
Second Power Domain
1115

AUTARCHICAL POWER DOMAINS FOR EXECUTING MINIMAL RISK CONDITIONS

FIELD OF THE INVENTION

The field of the invention is vehicle systems, or, more specifically an architecture for providing redundant power to one or more systems of an autonomous vehicle.

SUMMARY

A system includes a power supply and a plurality of buses coupled to the power supply. A bus selector is coupled to an output of each of the plurality of buses. A power storage unit that is separate from the power supply is coupled to an output of the power supply via the bus selector. A power controller is coupled to an output of the bus selector and to an output of the power storage unit. The power controller selects a power output as the output of the power supply or the output of the power storage unit.

In some embodiments, the power output of the power controller is coupled to a first power domain and to a second power domain. At least one of the first power domain or the second power domain receive power from the power output of the power controller. In some embodiments, the system is included in an autonomous vehicle, with the first power domain and the second power domain including one or more microprocessors that control one or more autonomous vehicle control systems of the autonomous vehicle. The first power domain includes at least one microprocessor, and the second power domain similarly includes at least one microprocessor.

In some embodiments, an autonomous vehicle includes a first power domain that includes one or more first microprocessors. The one or more first microprocessors control a collection of systems that control movement of the autonomous vehicle. The autonomous vehicle also includes a second power domain including one or more second microprocessors, with the second microprocessor also controlling the systems that control movement of the autonomous vehicle. A domain controller is coupled to the first power domain and to the second power domain. The domain controller determines hat that the first power domain or the second power domain is capable of providing instructions for the autonomous vehicle to complete a minimal risk condition using the collection of systems. In response to determining the first power domain is not capable of providing instructions for the autonomous vehicle to complete a minimal risk condition using the collection of systems, the domain controller routes power form the first power domain to the second power domain.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

The terminology used herein for the purpose of describing particular examples is not intended to be limiting for further examples. Whenever a singular form such as "a," "an," and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes," and/or "including," when used, specify the presence of the stated features, integers, steps, operations, processes, acts, elements, and/or components, but do not preclude the presence or addition of one or more other features, integers, steps, operations, processes, acts, elements, components, and/or any group thereof. Additionally, when an element is described as "plurality," it is understood to mean two or more of such an element. However, as set forth above, further examples may implement the same functionality using a single element.

It will be understood that when an element is referred to as being "connected" or "coupled" to another element, the elements may be directly connected or coupled or via one or more intervening elements. If two elements A and B are combined using an "or," this is to be understood to disclose all possible combinations, i.e. only A, only B, as well as A and B. An alternative wording for the same combinations is "at least one of A and B." The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

Figure 1:
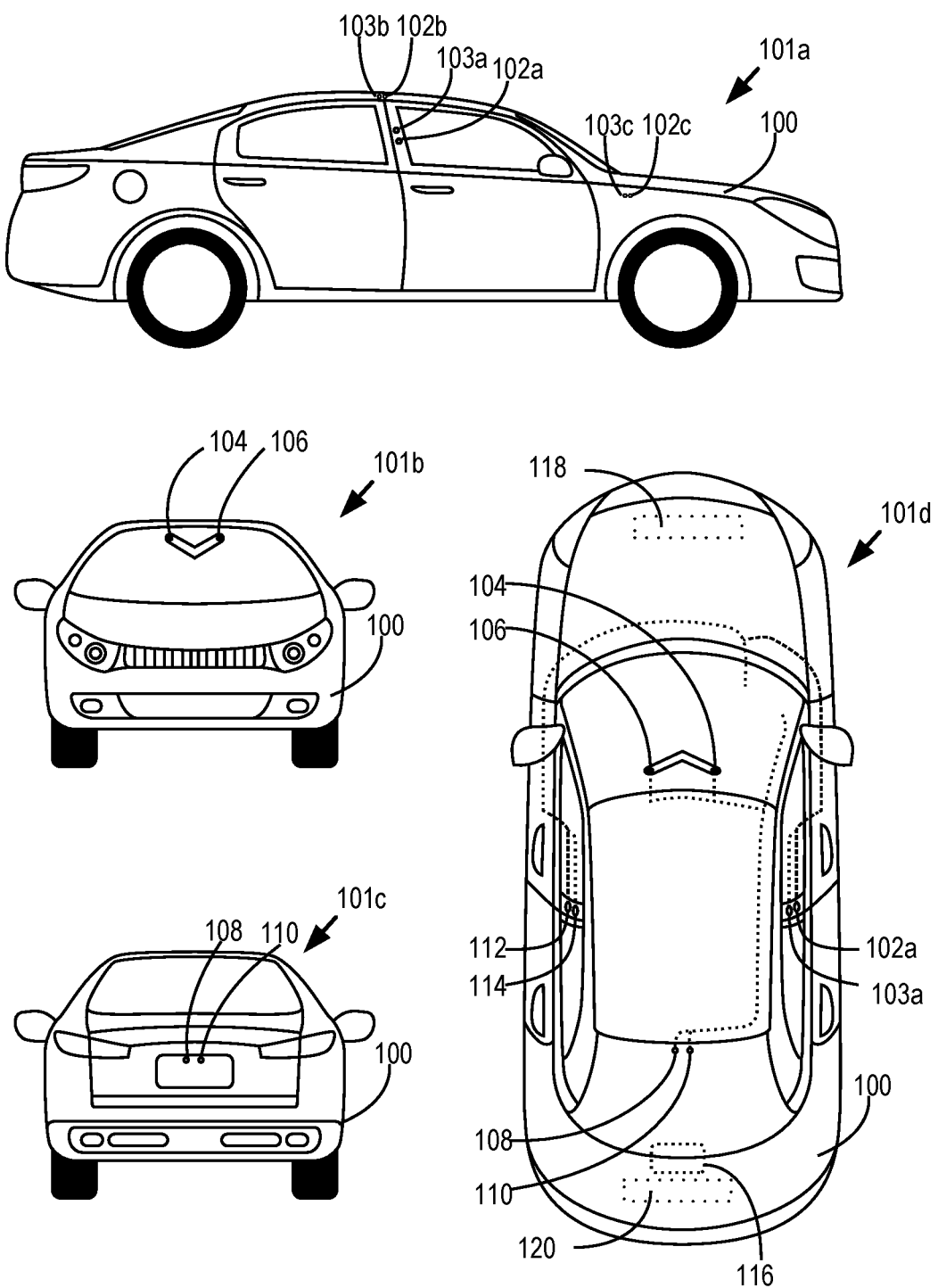
FIG. 1 shows example views of an autonomous vehicle for autonomous vehicle model training using low-discrepancy sequences according to some embodiments of the present disclosure.

Autonomous vehicle model training using low-discrepancy sequences may be implemented in an autonomous vehicle. Accordingly, FIG. 1 shows multiple views of an autonomous vehicle 100 configured for autonomous vehicle model training using low-discrepancy sequences according to embodiments of the present disclosure. Right side view 101*a* shows a right side of the autonomous vehicle 100. Shown in the right-side view 101*a* are right-facing cameras 102*a* and 103*a*, configured to capture image data, video data, and/or audio data of the environment external to the autonomous vehicle 100 from the perspective of the right side of the car. Cameras 102*a* and 103*a* are depicted in an exemplary placement location on the autonomous vehicle. In some embodiments, cameras may also be placed in additional or different locations on the autonomous vehicle 100. For example, in some embodiments, cameras 102*b* and 103*b* or cameras 102*c* and 103*c* may be used instead of or in addition to cameras 102*a* and 103*a*.

Front view 101*b* shows a front side of the autonomous vehicle 100. Shown in the front view 101*b* are cameras 104 and 106, configured to capture image data, video data, and/or audio data of the environment external to the autonomous vehicle 100 from the perspective of the front of the car. Rear view 101*c* shows a rear side of the autonomous vehicle 100. Shown in the rear view 101*c* are cameras 108 and 110, configured to capture image data, video data, and/or audio data of the environment external to the autonomous vehicle 100 from the perspective of the rear of the car. Top view 101*d* shows a rear side of the autonomous vehicle 100. Shown in the top view 101*d* are cameras 102*a*-110. Although the top view 101*d* shows cameras 102*a* and 103*a* as right-facing cameras for the autonomous vehicle 100, in some embodiments, other placement locations for right-facing cameras may also be used, such as those of cameras 102*b* and 103*b* or cameras 102*b* and 103*b* as described above. Also shown are left-facing cameras 112 and 114, configured to capture image data, video data, and/or audio data of the environment external to the autonomous vehicle 100 from the perspective of the left side of the car. In some embodiments, other placement locations for left-facing cameras may also be used, such as those similar to cameras 102*b* and 103*b* or cameras 102*b* and 103*b* at corresponding locations on the left side of the car.

As shown, the autonomous vehicle 100 may include pairs of cameras each facing the same direction relative to the autonomous vehicle 100 (e.g., a pair of forward-facing cameras 104 and 106, a pair of rear-facing cameras 108 and 110, a pair of right-facing cameras 102*a* and 103*a*, a pair of left-facing cameras 112 and 114). In some embodiments, each of these cameras may be installed or deployed in a stereoscopic configuration such that each pair of cameras may be used for stereoscopic vision using image data from each camera in the camera pair. In other words, each camera in a given pair may face the same direction and have a substantially overlapping field of view such that their respective image data may be used for stereoscopic vision as will be described below.

Further shown in the top view 101*d* is an automation computing system 116. The automation computing system 116 comprises one or more computing devices configured to control one or more autonomous operations (e.g., autonomous driving operations) of the autonomous vehicle 100. For example, the automation computing system 116 may be configured to process sensor data (e.g., data from the cameras 102*a*-114 and potentially other sensors), operational data (e.g., a speed, acceleration, gear, orientation, turning direction), and other data to determine an operational state and/or operational history of the autonomous vehicle. The automation computing system 116 may then determine one or more control operations or driving decisions for the autonomous vehicle 100 (e.g., a change in speed or acceleration, a change in brake application, a change in gear, a change in turning or orientation). The automation computing system 116 may also store captured sensor data for later use, transmission, and the like. Operational data of the autonomous vehicle may also be stored in association with corresponding sensor data, thereby indicating the operational data of the autonomous vehicle 100 at the time the sensor data was captured.

Also shown in the top view 101*d* is a radar sensor 118. The radar sensor 118 uses radio waves to detect objects in the environment relative to the autonomous vehicle 100. The radar sensor 118 may also detect or track various attributes of such objects, including distance, velocity, angle of movement and the like. The measurements of the radar sensor 118 may be provided as sensor data (e.g., radar data) to the automation computing system 116.

The radar data from the radar sensor 118 may be used in a variety of ways to facilitate autonomous driving functionality. As an example, the radar sensor 118 may be used in isolation or in conjunction with other sensors, such as camera sensors, to track persistence of various objects. As described herein, persistence includes determining that a particular object identified at a particular instance (e.g., in camera sensor data, in radar sensor 118 data, or both) is the same object in subsequent instances. The radar sensor 118 may also facilitate detecting the size, shape, type, or speed of particular objects. These detected attributes may be correlated with or used to verify estimations of these attributes from camera sensors. As a further example, the radar sensor 118 may facilitate detecting voids in the environment where no object is present.

The radar sensor 118 provides several advantages over camera sensors in detecting the environment relative to the autonomous vehicle 100. For example, the radar sensor 118 provides for greater accuracy at longer distances. The radar sensor 118 may also provide for more accurate estimations of velocity or movement of objects. Moreover, as the radar sensor 118 does not operate in the optical spectrum, performance degradation of the radar sensor 118 in inclement weather is lesser than with camera sensors. Radar sensors 118 also provide some level of vertical resolution in some embodiments, with a tradeoff between distance and vertical resolution.

In some embodiments, the autonomous vehicle 100 may also include an additional radar sensor 120. For example, where the radar sensor 118 is positioned at a front bumper of the autonomous vehicle 100, the autonomous vehicle 100 may also include the additional radar sensor 120 positioned at the rear bumper. Such an additional radar sensor allows for multispectral (e.g., both visual and radar) coverage of the environment at the rear of the car. This provides advantages over ultrasonic sensors at the rear bumper which generally have a limited distance relative to radar.

Although the autonomous vehicle 100 of FIG. 1 is shown as car, it is understood that autonomous vehicles 100 configured for autonomous vehicle model training using low-discrepancy sequences may also include other vehicles, including motorcycles, planes, helicopters, unmanned aerial vehicles (UAVs, e.g., drones), or other vehicles. Moreover, it is understood that additional cameras or other external sensors may also be included in the autonomous vehicle 100.

Autonomous vehicle model training using low-discrepancy sequences in accordance with the present disclosure is generally implemented with computers, that is, with automated computing machinery. For further explanation, therefore, FIG. 2 sets forth a block diagram of automated computing machinery comprising an exemplary automation computing system 116 configured for autonomous vehicle model training using low-discrepancy sequences according to specific embodiments. The automation computing system 116 of FIG. 2 includes at least one computer Central Processing Unit (CPU) package 204 as well as random access memory 206 ('RAM') which is connected through a high-speed memory bus 208 and bus adapter 210 to CPU packages 204 via a front side bus 211 and to other components of the automation computing system 116.

A CPU package 204 may comprise a plurality of processing units. For example, each CPU package 204 may comprise a logical or physical grouping of a plurality of processing units. Each processing unit may be allocated a particular process for execution. Moreover, each CPU package 204 may comprise one or more redundant processing units. A redundant processing unit is a processing unit not allocated a particular process for execution unless a failure occurs in another processing unit. For example, when a given processing unit allocated a particular process fails, a redundant processing unit may be selected and allocated the given process. A process may be allocated to a plurality of processing units within the same CPU package 204 or different CPU packages 204. For example, a given process may be allocated to a primary processing unit in a CPU package 204. The results or output of the given process may be output from the primary processing unit to a receiving process or service. The given process may also be executed in parallel on a secondary processing unit. The secondary processing unit may be included within the same CPU package 204 or a different CPU package 204. The secondary processing unit may not provide its output or results of the process until the primary processing unit fails. The receiving process or service will then receive data from the secondary processing unit. A redundant processing unit may then be selected and allocated the given process to ensure that two or more processing units are allocated the given process for redundancy and increased reliability.

The CPU packages 204 are communicatively coupled to one or more sensors 212. The sensors 212 are configured to capture sensor data describing the operational and environmental conditions of an autonomous vehicle. For example, the sensors 212 may include cameras (e.g., the cameras 102a-114 of FIG. 1), accelerometers, Global Positioning System (GPS) radios, LiDAR sensors, radar sensors such as radar sensors 118, 120 of FIG. 1, or other sensors. As described herein, cameras may include solid state cameras with a solid-state shutter capable of measuring photons or a time of flight of photons. For example, a camera may be configured to capture or measure photons captured via the shutter for encoding as images and/or video data. As another example, a camera may emit photons and measure the time of flight of the emitted photons. Cameras may also include event cameras configured to measure changes in light and/or motion of light.

Although the sensors 212 are shown as being external to the automation computing system 116, it is understood that one or more of the sensors 212 may reside as a component of the automation computing system 116 (e.g., on the same board, within the same housing or chassis). The sensors 212 may be communicatively coupled with the CPU packages 204 via a switched fabric 213. The switched fabric 213 comprises a communications topology through which the CPU packages 204 and sensors 212 are coupled via a plurality of switching mechanisms (e.g., latches, switches, crossbar switches, field programmable gate arrays (FPGAs)). For example, the switched fabric 213 may implement a mesh connection connecting the CPU packages 204 and sensors 212 as endpoints, with the switching mechanisms serving as intermediary nodes of the mesh connection. The CPU packages 204 and sensors 212 may be in communication via a plurality of switched fabrics 213. For example, each of the switched fabrics 213 may include the CPU packages 204 and sensors 212, or a subset of the CPU packages 204 and sensors 212, as endpoints. Each switched fabric 213 may also comprise a respective plurality of switching components. The switching components of a given switched fabric 213 may be independent (e.g., not connected) of the switching components of other switched fabrics 213 such that only switched fabric 213 endpoints (e.g., the CPU packages 204 and sensors 212) are overlapping across the switched fabrics 213. This provides redundancy such that, should a connection between a CPU package 204 and sensor 212 fail in one switched fabric 213, the CPU package 204 and sensor 212 may remain connected via another switched fabric 213. Moreover, in the event of a failure in a CPU package 204, a processor of a CPU package 204, or a sensor, a communications path excluding the failed component and including a functional redundant component may be established. In some embodiments, other data links or communications pathways may be used instead of or in conjunction with switched fabrics 213, including cable connections between two endpoints, wireless communications links, or other data links.

The CPU packages 204 and sensors 212 are configured to receive power from one or more power supplies 215. The power supplies 215 may comprise an extension of a power system of the autonomous vehicle 100 or an independent power source (e.g., a battery, a capacitor). The power supplies 215 may supply power to the CPU packages 204 and sensors 212 by another switched fabric 214. The switched fabric 214 provides redundant power pathways such that, in the event of a failure in a power connection, a new power connection pathway may be established to the CPU packages 204 and sensors 212. In some embodiments, other power couplings may be used instead of or in conjunction with the switched fabric 214, such as a direct power cable coupling of a power supply 215 to another component.

Stored in RAM 206 is an autonomy engine 250. As will be described in further detail below, the autonomy engine 250 may enable autonomous driving functionality for the autonomous vehicle 100. Accordingly, in some embodiments, the autonomy engine 250 may perform various data processing or data analytics operations to enable autonomous driving functionality, including the processing of sensor data, generation of driving decisions, and the like.

Figure 2:
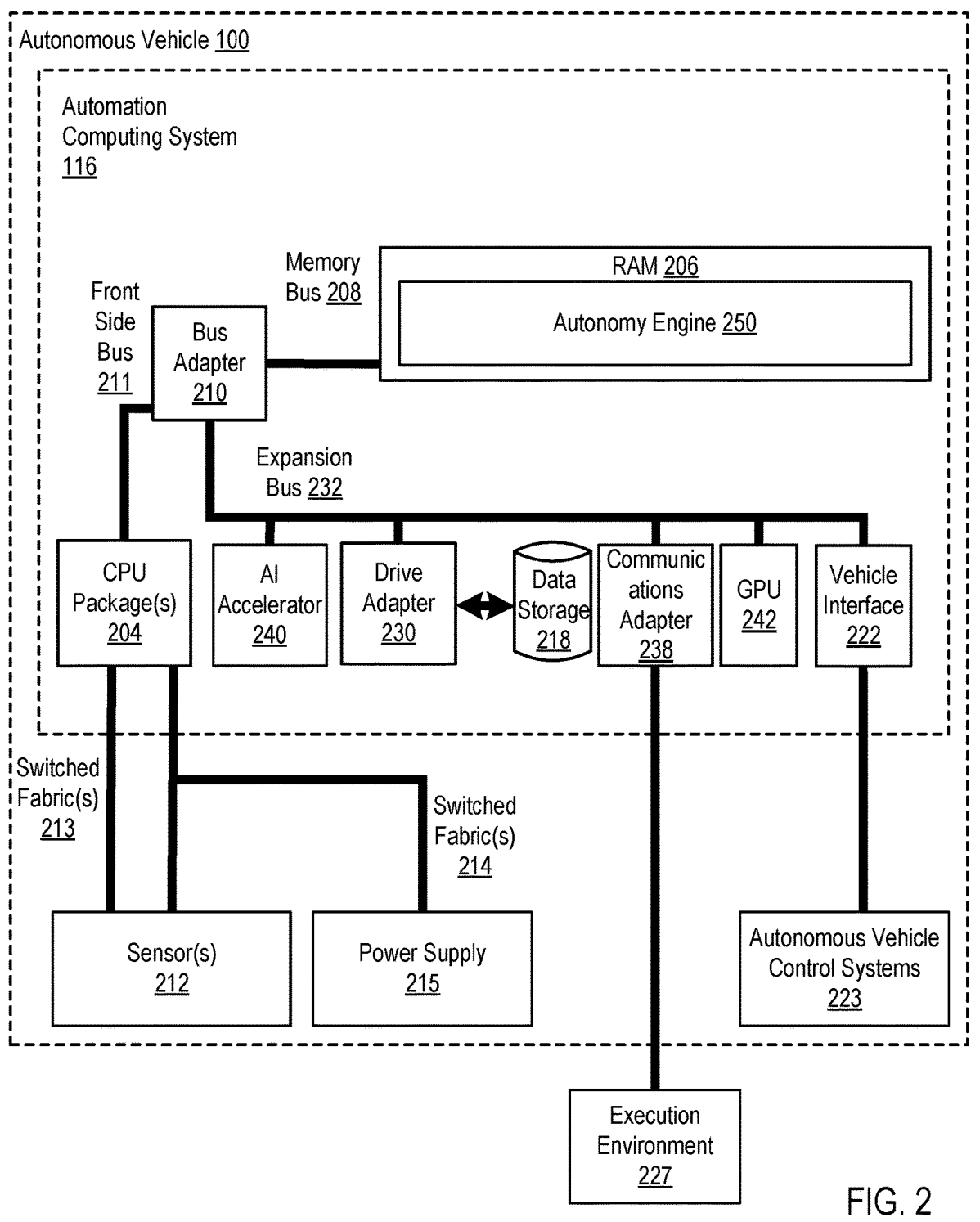
FIG. 2 is a block diagram of an autonomous computing system for autonomous vehicle model training using low-discrepancy sequences according to some embodiments of the present disclosure.

The automation computing system 116 of FIG. 2 includes disk drive adapter 230 coupled through expansion bus 232 and bus adapter 210 to CPU package(s) 204 and other components of the automation computing system 116. Disk drive adapter 230 connects non-volatile data storage to the automation computing system 116 in the form of data storage 218. Disk drive adapters 230 useful in computers configured for autonomous vehicle model training using low-discrepancy sequences according to various embodiments include Integrated Drive Electronics ('IDE') adapters, Small Computer System Interface ('SCSI') adapters, and others. Non-volatile computer memory also may be implemented for as an optical disk drive, electrically erasable programmable read-only memory (so-called 'EEPROM' or 'Flash' memory), RAM drives, and so on.

The exemplary automation computing system 116 of FIG. 2 includes a communications adapter 238 for data communications with other computers and for data communications with a data communications network. Such data communications may be carried out serially through RS-238 connections, through external buses such as a Universal Serial Bus ('USB'), through data communications networks such as IP data communications networks, and in other ways. Communications adapters implement the hardware level of data communications through which one computer sends data communications to another computer, directly or through a data communications network. Examples of communications adapters useful in computers configured for autonomous vehicle model training using low-discrepancy sequences according to specific embodiments include modems for wired dial-up communications, Ethernet (IEEE 802.3) adapters for wired data communications, 802.11 adapters for wireless data communications, as well as mobile adapters (e.g., cellular communications adapters) for mobile data communications. For example, the automation computing system 116 may communicate with one or more remotely disposed execution environments 227 via the communications adapter 238.

The exemplary automation computing system of FIG. 2 also includes one or more Artificial Intelligence (AI) accelerators 240. The AI accelerator 240 provides hardware-based assistance and acceleration of AI-related functions, including machine learning, computer vision, etc. Accordingly, functionality of the autonomy engine 250 or other operations of the automation computing system 116 may be performed at least in part by the AI accelerators 240.

The exemplary automation computing system of FIG. 2 also includes one or more graphics processing units (GPUs) 242. The GPUs 242 are configured to provide additional processing and memory resources for processing image and/or video data, including encoding, decoding, etc. Accordingly, functionality of the autonomy engine 250 or other operations of the automation computing system 116 may be performed at least in part by the GPUs 242.

Figure 3:
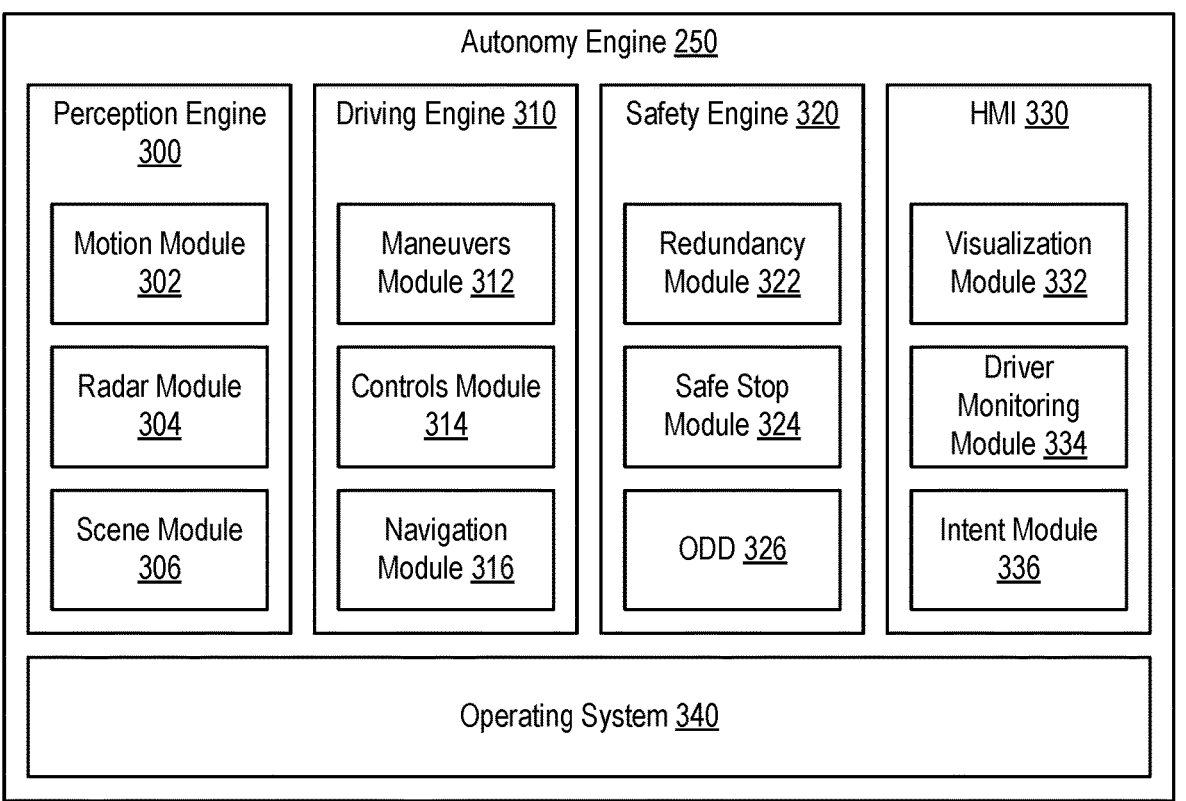
FIG. 3 is a block diagram of an example autonomy engine for autonomous vehicle model training using low-discrepancy sequences according to some embodiments of the present disclosure.

FIG. 3 shows a block diagram of an exemplary autonomy engine 250 for autonomous vehicle model training using low-discrepancy sequences according to some embodiments of the present disclosure. The autonomy engine 250 facilitates autonomous driving operations of the autonomous vehicle 100. In some embodiments, the autonomy engine 250 includes a perception engine 300. The perception engine 300 facilitates the capture and processing of sensor data from various sensors 212 in order to determine an environmental state relative to the autonomous vehicle 100. The environmental state may describe, for example, indications of objects in the environment, identification or classification of those objects, velocity and motion direction of those objects, indications and placement of particular road features including lane markers, intersections, turns, and other environmental features.

In some embodiments, the perception engine 300 includes a motion module 302. The motion module 302 uses visual information (e.g., image data from cameras) to detect objects in the environment relative to the autonomous vehicle 100 and calculate various motion attributes of those objects, including distance, velocity, and motion direction. In some embodiments, the motion module 302 may be implemented using one or more neural networks. In some embodiments, the motion module 302 may use a stereoscopic neural network that processes stereoscopic image data from a pair of cameras in a stereoscopic configuration in order to detect objects and calculate their various motion attributes. In some embodiments, the motion module 302 may use a monoscopic neural network that processes non-stereoscopic image data from individual cameras to detect objects and calculate their various motion attributes. In other words, objects may be detected, and their motion attributes calculated, without the need for image data from another camera (e.g., another camera in a stereoscopic configuration).

In some embodiments, the autonomous vehicle 100 may include complementary or fallback camera modalities usable by the motion module 302. This increases the robustness of a perception system of the autonomous vehicle 100 by allowing alternate modalities to perceive environmental conditions. As an example, there may be a left and a right camera in a stereoscopic configuration, with each camera pointed in approximately the same direction that allows the autonomous vehicle 100 to perceive objects in that direction. Different camera modes of the two cameras may allow the cameras to operate stereoscopically, monoscopically using the left camera, monoscopically using the right camera, or a combination of any of these. The autonomous vehicle 100 may use images from the cameras for a variety of purposes, such as to determine existence of objects in the environment, determine distance to objects from the autonomous vehicle, or determine velocities of objects from the autonomous vehicle. Depending on the camera modality, the autonomous vehicle 100 may use different techniques to determine environmental conditions. For example, while using a single camera, the autonomous vehicle 100 may use techniques such as object (or blob) expansion, bounding box expansion, known size position or comparison techniques, defocusing, or other techniques to determine distance or velocity of objects in the environment. When using two cameras, the autonomous vehicle 100 may use techniques such as stereoscopy to determine distance or velocity of objects in the environment.

In some embodiments, the motion module 302 may operate in a stereoscopic and monoscopic modality concurrently. Thus, for a given pair of stereoscopic cameras, the stereoscopic neural network may be used to process image data from the pair of stereoscopic cameras while the monoscopic neural network may be used to process image data from one or both cameras individually. In some embodiments, the output of each neural network may be used to reinforce or otherwise affect the output of the other. For example, a downstream component may use the output of the monoscopic neural network to verify or validate the output of the stereoscopic neural network. As another example, the similarity between output of the stereoscopic neural network and monoscopic neural network may be used to increase confidence scores or other values associated with their respective outputs. In some embodiments, as will be described in more detail below, the stereoscopic and monoscopic neural networks may be executed concurrently such that, should an error occur that prevents the use of stereoscopic imagery (e.g., a camera failure), a monoscopic neural network is already executing and has sufficient image data history so as to be useful in detecting objects and calculating their respective motion attributes.

A radar module 304 processes data from one or more radar sensors 118,120 to facilitate determining the environmental state relative to the autonomous vehicle 100. In some embodiments, a radar data cube may be generated that defines a three-dimensional space, with each portion in the three-dimensional space either having an object occupying it or being empty. Changes in radar data cubes over time may be used to detect objects and calculate their respective motion attributes as described above. In some embodiments, the radar module 304 may be used to calculate an ambient velocity of the scene relative to the autonomous vehicle 100. The ambient velocity is a collective or aggregate velocity of multiple objects in the environment, such as the autonomous vehicle 100 and other vehicles occupying the road. Accordingly, the ambient velocity may include an ambient velocity for particular lanes or the entire road as detectable by the radar sensors 118,120.

The scene module 306 determines possible actions or maneuvers performable by the autonomous vehicle 100 based on the environment relative to the autonomous vehicle. The scene module 306 may detect the environment relative to the autonomous vehicle 100 using image data from cameras, radar data, and/or other sensor data. For example, the scene module 306 may detect road features such as lane markers, changes in the road such as curvature, splits or convergence, intersections, and the like as identified in image data from cameras of the autonomous vehicle 100. Such road features may constrain maneuvers performable by the autonomous vehicle 100 (e.g., due to constraints within a particular lane), or present possible maneuvers (e.g., a possible turn at an intersection). As another example, objects identified by the motion module 302 as well as their respective motion attributes may be provided as input to the scene module 306. Such identified objects may affect or constrain possible actions or maneuvers due to risk of collision or other factors.

In some embodiments, one or more trained neural networks may be used by the scene module 306 to determine possible actions or maneuvers of the autonomous vehicle 100. For example, the possible actions or maneuvers may be determined based on a predicted environmental state (e.g., a predicted state of the road). Accordingly, in some embodiments, a neural network may be trained based on various lane and/or intersection configurations in order to predict the state of the road and determine possible actions or maneuvers. In some embodiments, the neural network may be trained using a corpus of data defining all combinations of road and intersections as limited by rules or laws for road construction. This improves the safety and performance of the autonomous vehicle 100 by ensuring that the neural network is trained on any possible road condition or configuration that the autonomous vehicle 100 may encounter. The scene module 306 allows for determination of possible actions for an autonomous vehicle 100 without requiring high-definition maps of the road traversed by the autonomous vehicle 100.

Although described as different modules, in some embodiments, each module of the perception engine 300 may affect the functionality of the other. For example, output of one module may be provided as input to another module, or output of one module may be correlated with output of another module for verification, confidence estimation, and the like. In some embodiments, the neural networks described above may be implemented as separate neural networks or combined into a same network. For example, one or more neural networks of the radar module 304 may be combined with one or more neural networks of the motion module 302 to perform their respective calculations. Various combinations or configurations of such neural networks are contemplated within the scope of the present disclosure.

The driving engine 310 determines and executes maneuvers (e.g., driving decisions) for the autonomous vehicle 100. As described herein, a maneuver describes an action or combination of actions to be performed by the autonomous vehicle 100, particularly with respect to movement of the autonomous vehicle. A maneuver may also be referred to as a driving decision, with such terms being used interchangeably herein. In some embodiments, the driving engine 310 includes a maneuvers module 312. The maneuvers module 312 determines, based on various inputs, a particular maneuver to be executed. For example, the maneuvers module 312 may receive from the scene module 306 an indication of possible maneuvers that may be performed. The maneuvers module 312 may then select a particular maneuver for execution.

In some embodiments, selecting a particular maneuver for execution may be based on costs associated with possible paths. For example, in some embodiments, selecting a particular maneuver may include optimizing one or more cost functions (e.g., by optimizing path costs). In some embodiments, path costs may be determined using one or more lattices with each lattice focusing on a different aspect of the drive (e.g., safety, comfort, efficiency). Maneuvers may then be selected for a path optimized for one or more of the lattices.

In some embodiments, the driving engine 310 includes a controls module 314. A controls module 314 generates control signals to actuate various components in order to perform maneuvers. For example, control signals may be provided via a vehicle interface 222 to autonomous vehicle control systems 223 to actuate acceleration, braking, steering, and the like in order to perform a maneuver. In some embodiments, the maneuvers module 312 may provide a particular maneuver to the controls module 314. The controls module 314 then determines and outputs the particular control signals required to perform the maneuver. As an example, assume that the maneuvers module 312 outputs a maneuver of a lane change to a lane to the left of the autonomous vehicle 100. The controls module 314 may then output a control signal to a steering system to angle the autonomous vehicle 100 some amount to the left. As another example, assume that the maneuvers module 312 outputs a maneuver to perform a right turn at an intersection. The controls module 314 may then output a control signal to the steering system to turn the car to the right and also output a control signal to the braking system to decelerate the autonomous vehicle 100 during the turn.

In some embodiments, the driving engine 310 may include a navigation module 316. The navigation module 316 may determine a route for the autonomous vehicle 100 to travel. The route may be based on a currently selected destination or based on other criteria. The route may be provided, for example, as input to a maneuvers module 312 such that maneuvers may be selected for traveling along the determined route. For example, the determined route may affect one or more cost functions associated with selecting a particular maneuver.

The safety engine 320 implements one or more features to ensure a safe driving experience when in an autonomous driving mode. In some embodiments, the safety engine 320 includes a redundancy module 322. The redundancy module 322 may detect errors associated with particular components of the autonomous vehicle 100. The redundancy module 322 may also perform remedial actions for these errors using redundant components for an erroneous component. For example, in some embodiments, the redundancy module 322 may establish or remove data or power pathways between components using switch fabrics as described above. Thus, the redundancy module 322 may establish data or power pathways to a redundant component when a corresponding component fails. This ensures that the autonomous vehicle 100 may maintain autonomous driving functionality in the event of component failure. In some embodiments, the redundancy module 322 may control different camera modalities as described above. For example, in response to detecting an error associated with a first camera in a stereoscopic configuration with a second camera, the redundancy module 322 may indicate (e.g., to the motion module 302) to operate in a monoscopic modality using the second camera. This allows the autonomous vehicle 100 to maintain autonomous driving functionality in the event of a camera failure, improving overall performance and safety.

In some embodiments, the safety engine 320 includes a safe stop module 324. The safe stop module 324 may cause the autonomous vehicle 100 to execute a safe stop maneuver. A safe stop maneuver is a sequence or combination of one or more maneuvers that will bring the autonomous vehicle 100 to a safe stop. Criteria for what is considered a safe stop may vary according to particular environmental considerations, including a type of road being traversed, traffic conditions, weather conditions, and the like. For example, a safe stop on a busy highway may include directing the vehicle to stop on the shoulder of the highway. As another example, a safe stop in a no or low traffic environment may include bringing the vehicle to an initial stop on the road before a human driver takes control.

The particular maneuvers required to execute the safe stop may be determined by the maneuvers module 312. For example, in addition to determining maneuvers to execute a particular driving path, the maneuvers module 312 may also concurrently determine maneuvers required to execute a safe stop maneuver. Thus, the maneuvers module 312 may continually update a stored sequence of maneuvers to reflect the most recently determined safe stop maneuver. In response to some condition or error state, such as critical component failure or another error that may affect safe autonomous driving, the safe stop module 324 may signal the maneuvers module 312 to execute the most recently determined safe stop maneuver. The maneuvers module 312 may then send to the controls module 314, the various maneuvers to perform the safe stop maneuver.

In some embodiments, the safety engine 320 includes an operational design domain (ODD) 326. The ODD 326 defines various operating conditions in which the autonomous vehicle 100 may operate autonomously. The ODD 326 may include, for example, particular environmental restrictions, geographical restrictions, time-of-day restrictions, and the like. The restrictions of the ODD 326 may correspond to different legal requirements, regulatory requirements, engineering considerations, and the like. The ODD 326 ensures that the autonomous vehicle 100 only operates autonomously within the bounds defined by the ODD 326, improving safety and ensuring conformity with relevant legal and regulatory restrictions. Enforcement of the ODD may include through automatic means.

The autonomy engine 250 also includes a human machine interface (HMI) 330. The HMI 330 presents various content to the driver or other occupants of the autonomous vehicle 100 and monitors the driver for various inputs that may affect driving or other systems of the autonomous vehicle 100. In some embodiments, the HMI 330 includes a visualization module 332. The visualization module 332 generates and presents for display a representation of the environment relative to the autonomous vehicle 100 as perceived by the autonomous vehicle 100 (e.g., based on data from various sensors). For example, the visualization module 332 may present a representation of detected road lanes, objects, or other relevant driving information so that an occupant can understand why the autonomous vehicle 100 is performing a particular task or maneuver. The visualization module 332 may also present for display various information relating to the state of the vehicle, such as cabin temperature, whether lights or windshield wipers are on, and the like. In some embodiments, an interior of the autonomous vehicle 100 may include a display or monitor to which the HMI 330 may provide the information or environmental representation described above.

In some embodiments, the HMI 330 includes a driver monitoring module 334. The driver monitoring module 334 monitors behaviors or actions of a driver using sensors inside and/or outside of the autonomous vehicle 100. Such sensors may include cameras, infrared sensors, pressure sensors, and the like. In other words, the driver monitoring module 334 generates sensor data capturing the driver. The driver monitoring module 334 may thus monitor behaviors or actions of a driver both inside of the vehicle and outside of the vehicle. In some embodiments, the driver monitoring module 334 may also monitor behavior or actions of other occupants of the autonomous vehicle 100. The driver monitoring module 334 may detect behaviors or actions including gestures, voice commands, posture, gaze, and the like.

In some embodiments, the HMI 330 also includes an intent module 336. The intent module 336 derives an intent of the driver using sensor data from the driver monitoring module 334. For example, one or more trained modules or neural networks may derive a particular intent based on sensor data from the driver monitoring module 334. The intent of the driver is an action the driver wishes performed by the autonomous vehicle 100. For example, assume that the driver monitoring module 334 detects a driver outside of the vehicle approaching the trunk. The intent module 336 may determine that the trunk should be opened or unlocked. As another example, assume that the driver monitoring module 334 detects a particular gesture performed by the driver during an autonomous driving mode. The intent module 336 may determine that the gesture indicates that the speed of the vehicle should be increased. Accordingly, in some embodiments, the intent module 336 may generate, based on a determined intent, one or more control signals to actuate one or more components or systems of the autonomous vehicle 100.

In some embodiments, the autonomy engine 250 includes an operating system 340. The operating system 340 may include, for example, UNIX™, Linux™, Microsoft Windows™ Android™, and others, as well as derivatives thereof. In some embodiments, the operating system 340 includes a formally verified operating system 340. Formal verification uses mathematical proof techniques to establish properties or functionality of the operating system 340. For example, formal verification may cover all lines of code or decisions, a range of all possible inputs, or other factors in operating system 340 execution. The use of a formally verified operating system 340 verifies that the operating system 340 will function correctly during operation of the autonomous vehicle 100, thereby establishing the safety and reliability of the operating system 340 during autonomous driving.

The various components of the autonomy engine 250 may be embodied or encoded according to a variety of approaches. For example, the various components and/or subcomponents of the autonomy engine 250 (e.g., the various engines and modules) may be implemented using one or more containers, one or more virtual machines, or by other approaches. Moreover, though the autonomy engine 250 is described with respect to various different engines, modules, and the like, in some embodiments portions of their respective functionality may be implemented by a same or shared module, application, service, and the like.

In some embodiments, one or more components or functions of the autonomy engine 250 may be verified using simulation or other computerized methods. For example, a simulated vehicle in a simulated road environment may be operated using an instance of the autonomy engine 250. Thus, maneuvers or driving decisions by the simulated vehicle may be controlled by the autonomy engine 250. Verification may include determining whether the simulated vehicle operates as expected, satisfies certain conditions (e.g., stays within defined lane parameters, executes maneuvers within prescribed bounds), or other actions. In some embodiments, the autonomy engine 250 may undergo verification using a variety of different scenarios where the simulated vehicle begins operation in some defined simulated environmental state. The defined simulated environmental state may include parameters such as particular road conditions or road features, placement of the simulated vehicle on the road, a speed and direction of the simulated vehicle, placement of other vehicles on the road, speeds of such vehicles, and the like. In some embodiments, the autonomy engine 250 may be verified by encoding these parameters as a multidimensional space and generating a distribution of different simulation scenarios that evenly cover the multidimensional space. This improves the safety of the autonomous vehicle 100 by verifying the autonomy engine 250 across a full and evenly distributed space of possible driving scenarios.

Figure 4:
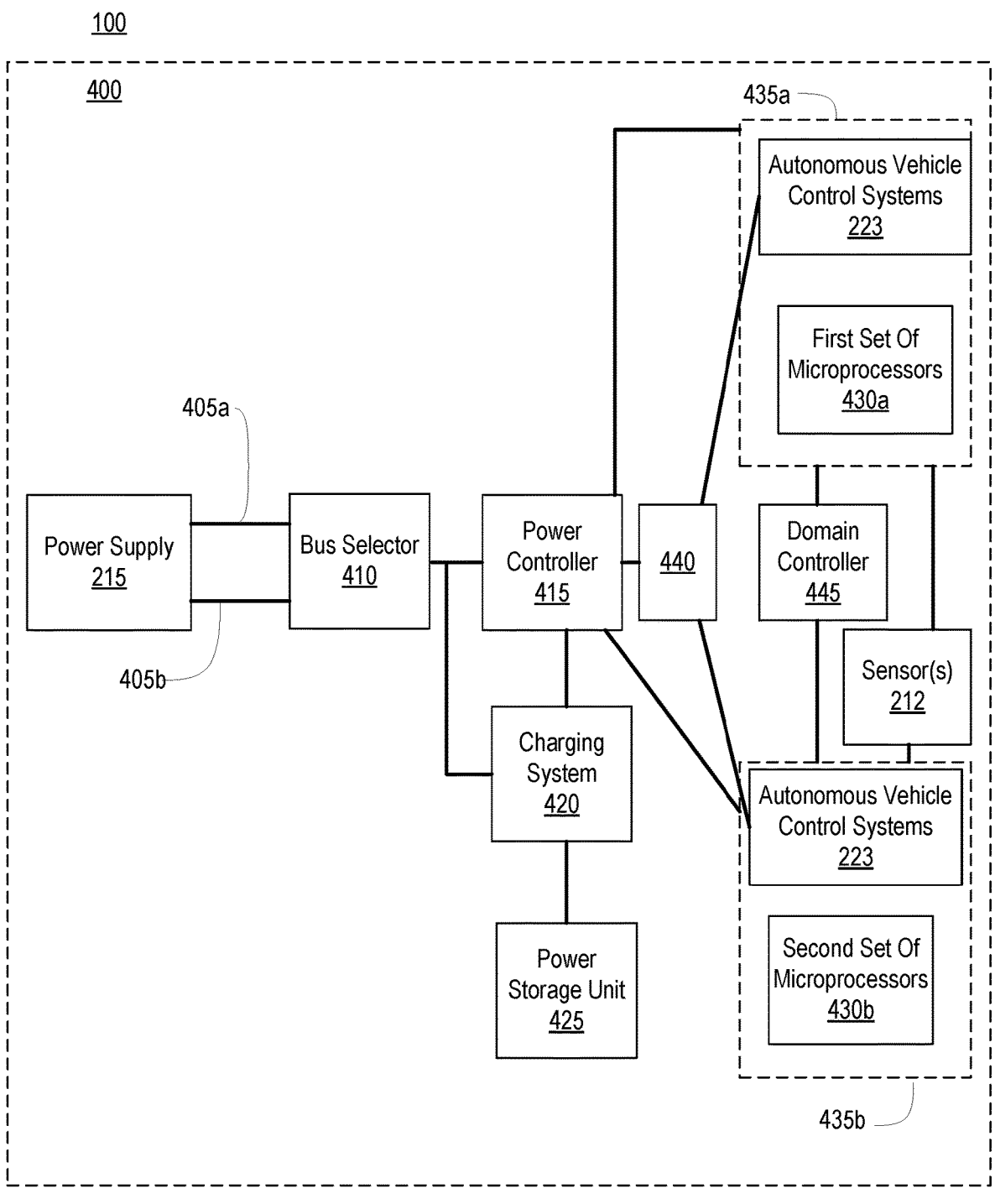
FIG. 4 is example system for redundantly supplying power to one or more microprocessors of an autonomous vehicle 100 according to some embodiments of the present disclosure.

FIG. 4 is an example system 400 for redundantly supplying power to one or more microprocessors of an autonomous vehicle 100. The system 400 includes a plurality of buses 405a, 405b (also referred to individually and collectively using reference number 405). Each bus 405 is coupled to the power supply 215 and to a bus selector 410. Further, each bus 405 of the plurality of buses 405 is independent of other buses 405 of the plurality of buses 405. While FIG. 4 shows an embodiment with two buses 405a, 405b, in other embodiments, different numbers of buses 405 are included in the system 400. For example, various embodiments include three buses 405, four buses 405, five buses 405, or any other number of buses 405.

The bus selector 410 selects one of the plurality of buses 405 as an output of the bus selector 410. The bus selector

410 is one or more integrated circuits or other logic circuits that selects one of the buses 405a, 405b as an output based on characteristics of voltage or current detected along bus 405a and bus 405b. For example, the bus selector 410 selects bus 405a as output in response to the bus selector 410 detecting a higher voltage on bus 405a than on bus 405b. Similarly, the bus selector 410 selects bus 405b as output in response to the bus selector 410 detecting a higher voltage on bus 405b than on bus 405a. In various embodiments, the bus selector 410 selects whichever bus 405 coupled to the bus selector 410 having a highest voltage as the output of the bus selector 410.

The output of the bus selector 410 is coupled to a power controller 415, which is also coupled to a power storage unit 425. In some embodiments, the output of the bus selector 410 is coupled to the power storage unit 425. The power controller 415 is a microcontroller, processor, logical circuit, field-programmable gate array (FPGA), or other structure configured to select a power output as one of the outputs of the bus selector 410 or the power storage unit 425. However, in some embodiments, such as the embodiment shown in FIG. 4, the output of the bus selector 410 is coupled to a charging system 420, with the charging system 420 coupled to the power storage unit 425. In some embodiments, the power controller 415 is coupled to the charging system 420, with the charging system 420 coupled to the power storage unit 425. However, in other embodiments, the power controller 415 is directly coupled to the power storage unit 425, and the output of the bus selector 410 is coupled to the charging system 420.

The power controller 415 selects the power output based on the output of the bus selector 410. The power output of the power controller 415 is coupled to at least one of a first power domain 435a or a second power domain 435b, with the first power domain 435a including a first set of microprocessors 430a and the second power domain 435b including a second set of microprocessors 430b. While FIG. 4 shows an example including two power domains, in other embodiments, additional power domains are coupled to the power controller 415 to increase redundancy. The power output selected by the power controller 415 is directed to at least one of the first power domain 435a or the second power domain 435b. In various embodiments, the power output is directed to a single power domain 435, with other power domains 435 not receiving power. In other embodiments, power is provided to a power domain 435a through the power output, with a portion of the power output sufficient for one or more microprocessors in the power domain 435b to operate in a standby mode directed to the power domain 435b

In various embodiments, the power controller 415 selects the power output based on a voltage of the output of the bus selector 410. For example, the power controller 415 selects the power output as the output of the bus selector 410 in response to determining the voltage of the output of the bus selector 410 is at least a threshold voltage. In the preceding example, the power controller 415 selects the power output as an output of the power storage unit 425 in response to determining the voltage of the output of the bus selector 410 is less than the threshold voltage. For example, the threshold voltage is a voltage sufficient to operate at least one of the first power domain 435a or the second power domain 435b. In some embodiments, the threshold voltage is specified as a voltage sufficient to operate the first set of microprocessors 430a or the second set of microprocessors 430b for at least a threshold amount of time. The threshold voltage is stored in a memory of the power controller 415 in various embodiments, allowing different systems 400 to specify different threshold voltages for selecting the power output of the power controller 415.

In various embodiments, the threshold voltage stored by the power storage unit 425 is sufficient to power the first power domain 435*a* or the second power domain 435*b* for a threshold amount of time for the autonomous vehicle 100 to complete a minimal risk condition. As used herein, a "minimal risk condition" specifies one or more actions for the autonomous vehicle 100 to complete while an autonomous mode to allow a driver to resume manual control of the autonomous vehicle 100 or for the autonomous vehicle 100 to safely come to a stop while in the autonomous mode. In some embodiments, the minimal risk condition specifies the autonomous vehicle 100 moving to an emergency lane or otherwise out of a lane including moving traffic and stopped. In other embodiments, the minimal risk condition specifies the autonomous vehicle 100 travels an off ramp and comes to a stop. As another example, a minimal risk condition specifies the autonomous vehicle 100 enters a lane for traffic moving at a slower speed. In another example, a minimal risk condition specifies the autonomous vehicle 100 perform autonomous control operations for a threshold amount of time to allow a driver to resume manual control of the autonomous vehicle 100. For another example, the minimal risk condition specifies the autonomous vehicle 100 come to a stop in a lane where the autonomous vehicle 100 Is currently travelling. In other embodiments, the minimal risk condition specifies multiple actions for the autonomous vehicle to complete 100. For example, a minimal risk condition specifies the autonomous vehicle 100 complete a maneuver in progress, move to a different lane than a current lane, identify a location out of a flow of traffic (e.g., on a side of a road), come to a stop in the identified location, park, and turn on hazard lights. In different embodiments, different combinations of actions or actions are specified as the minimal risk condition; for example, different autonomous vehicles 100 store information identifying different vehicle-specific minimal risk conditions. Both the first power domain 435*a* and the second power domain 435*b* are capable of providing instructions for completing the minimal risk condition.

The charging system 420 provides power from the output of the bus selector 410 to the power storage unit 425. This causes the output of the bus selector 410 to charge the power storage unit 425, allowing the power storage unit 425 to store power from the power supply 215 received via the output of the bus selector 410. In some embodiments, the charging system 420 obtains charging information from the power storage unit 425 and adjusts charging of the power storage unit 425 accordingly. For example, the charging system 420 obtains a current voltage from the power storage unit 425 and determines whether a current voltage of the power storage unit 425 is less than a threshold voltage.

The power storage unit 425 is a device configured to store power. Examples of the power storage unit 425 include a battery or a capacitor. In various embodiments, the power storage unit 425 is configured to store a minimum voltage for operating at least one of the first set of microprocessors 430*a* or the second set of microprocessors 430*b*. For example, the power storage unit 425 is configured to store a voltage capable of operating at least one of the first set of microprocessors 430*a* or the second set of microprocessors 430*b* for at least a threshold amount of time. The power storage unit 425 receives power from the output of the bus selector 410, so the power storage unit 425 accumulates power received from output of the bus selector 410. This allows the power storage unit 425 to act as an alternative power source that is charged while at least one of the buses 405 is supplying power as the output of the bus selector 410 and is used when the output of the bus selector 410 satisfies one or more criteria (e.g., when the output of the bus selector 410 has less than a threshold voltage). In different embodiments, the power storage unit 425 has different power storage capacities or charges at different rates. While FIG. 4 shows a single power storage unit 425 for purposes of illustration, in other embodiments, the system 400 includes multiple power storage units 425 coupled to the output of the bus selector 410 and to the power controller 415.

In the embodiment shown in FIG. 4, the power output of the power controller is coupled to a control bus 440 that comprises connections between the power controller 415 and each of at least a collection of autonomous vehicle control systems 223 to route power from the power storage unit 425 to at least the collection of autonomous vehicle control systems 223. Inclusion of the control bus 440 simplifies routing of power from the power storage unit 425 to different autonomous vehicle control systems 223. In some embodiments, the threshold amount of power stored by the power storage unit 425 is sufficient to operate the collection of autonomous vehicle control systems 223 and one of the first set of microprocessors 430*a* or the second set of microprocessors 430*b* for a sufficient amount of time for the autonomous vehicle 100 to complete a minimum risk condition. The collection of autonomous vehicle control systems 223 includes one or more autonomous vehicle control systems 223 capable of completing a minimal risk condition and capable of modifying movement of the autonomous vehicle 100. For example, the collection of autonomous vehicle control systems 223 includes a braking system and a steering system. One or more lighting systems may be included in the collection of autonomous vehicle control systems 223 in various implementations. The collection of autonomous vehicle control systems 223 excludes one or more autonomous vehicle control systems, such as an entertainment system or a heating and air conditioning control system, in various embodiments.

A domain controller 445 is coupled to the first power domain 435*a* and to the second power domain 435*b*. The domain controller 445 includes switching logic that redirects power from the power output of the power controller 415 to the first power domain 435*a* or to the second power domain 435*b* based on one or more conditions. For example, the domain controller 445 routes power that the first power domain 435*a* receives from the power output of the power controller 415 to the second power domain 435*b* in response to one or more microprocessors in the first power domain 435*a* providing less than a threshold amount of functionality. In various embodiments, the domain controller 445 monitors the first power domain 435*a* and the second power domain 435*b* and determines whether the first power domain 435*a* or the second power domain 435*b* is capable of providing instructions for the autonomous vehicle to complete a minimal risk condition using at least the collection of the autonomous vehicle control systems 223 that control movement of the autonomous vehicle 100 while the autonomous vehicle 100 is in an autonomous mode based on instructions provided by the first set of microprocessors 430*a* or by the second set of microprocessors 430*b*. In response to determining the first power domain 435*a* is not capable of providing instructions to at least the collection of autonomous vehicle control systems 223 to complete the minimal risk condition, the domain controller 445 routes power from the first power domain 435*a* to the second power domain 435*b*. Similarly, in response to determining the second power domain 435*b* is not capable of providing instructions to at least the collection of autonomous vehicle control systems 223 to complete the minimal risk condition, the domain controller 445 routes power from the second power domain 435*b* to the first power domain 435*a*. The domain controller 445 allows the power output of the power controller 415 to be routed to a power domain 435 capable of completing a minimal risk condition, providing redundancy for the autonomous vehicle completing a minimal risk condition while in an autonomous mode. This allows the domain controller 445 to direct the power output to a power domain 435 capable of executing functionality for completing a minimal risk condition, providing additional safety for a driver of the autonomous vehicle 100.

Figure 5:
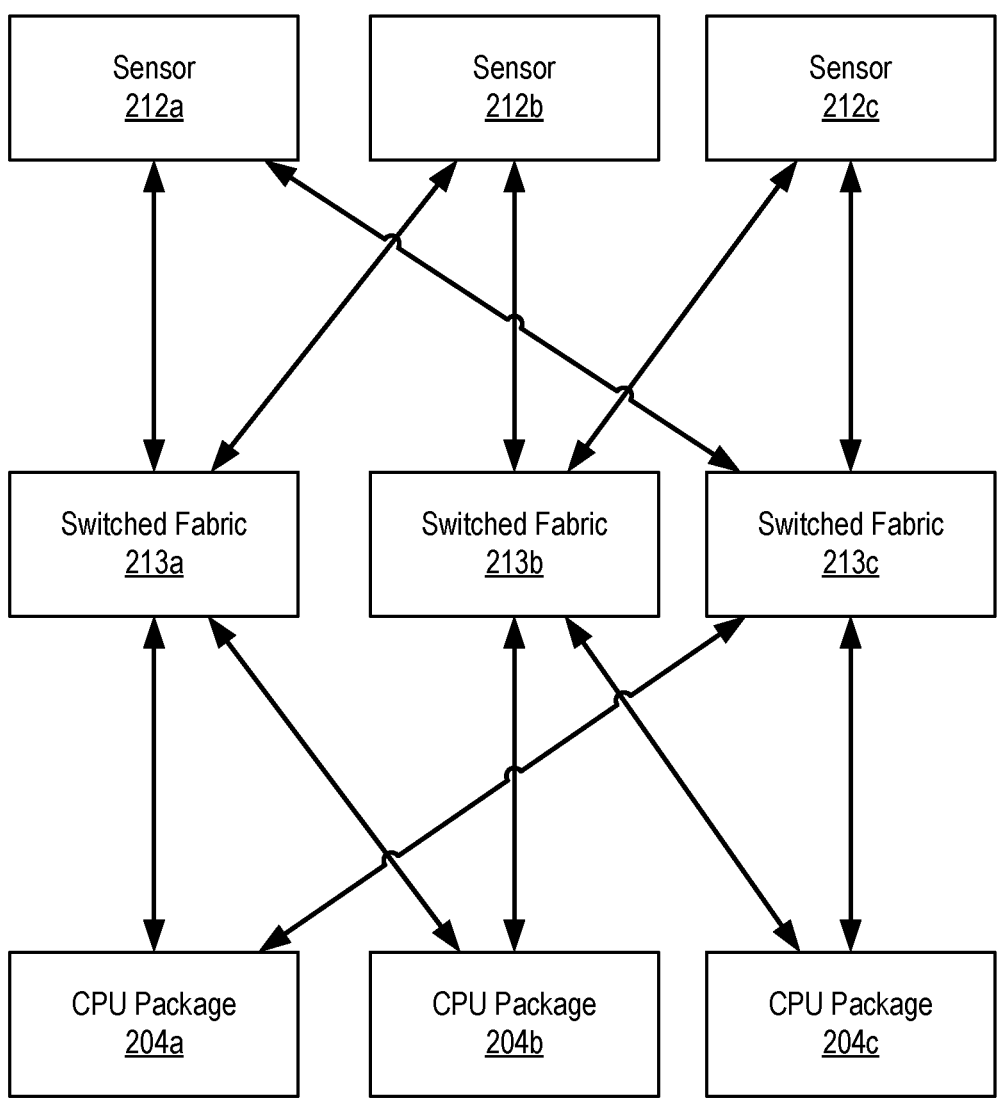
FIG. 5 is a block diagram of a redundant data fabric for autonomous vehicle model training using low-discrepancy sequences according to some embodiments of the present disclosure.

FIG. 5 shows an example redundant power fabric for autonomous vehicle model training using low-discrepancy sequences. The redundant power fabric provides redundant pathways for power transfer between the power supplies 215, the sensors 212, and the CPU packages 204. In this example, the power supplies 215 are coupled to the sensors 212 and CPU packages via two switched fabrics 214*a* and 214*b*. The topology shown in FIG. 5 provides redundant pathways between the power supplies 215, the sensors 212, and the CPU packages 204 such that power can be rerouted through any of multiple pathways in the event of a failure in an active connection pathway. The switched fabrics 214*a* and 214*b* may provide power to the sensors 212 using various connections, including Mobile Industry Processor Interface (MIPI), Inter-Integrated Circuit (I2C), Universal Serial Bus (USB), or another connection. The switched fabrics 214*a* and 214*b* may also provide power to the CPU packages 204 using various connections, including Peripheral Component Interconnect Express (PCIe), USB, or other connections. Although only two switched fabrics 214*a* and 214*b* are shown connecting the power supplies 215 to the sensors 212 and CPU packages 204, the approach shown by FIG. 5 can be modified to include three, four, five, or more switched fabrics 214. This example redundant power fabric improves the safety and reliability of the autonomous vehicle 100 by allowing for dynamic switching of power pathways to ensure that each component may receive the required power for operation should a power connection be damaged or otherwise negatively impacted.

Figure 6:
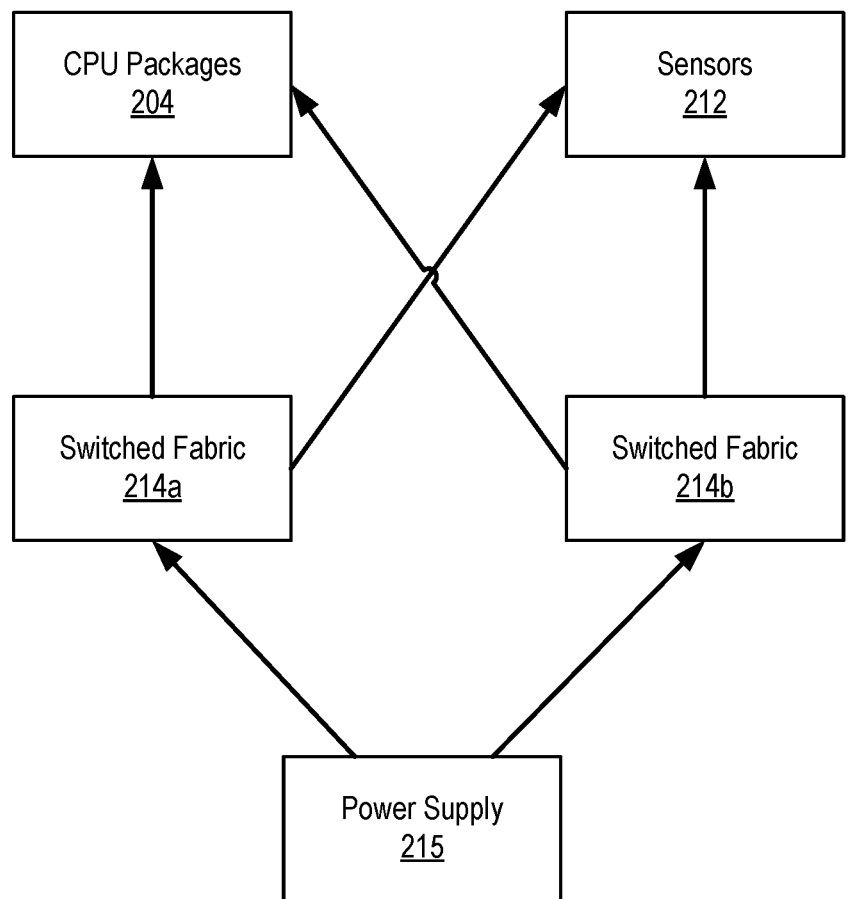
FIG. 6 is a block diagram of a redundant power fabric for autonomous vehicle model training using low-discrepancy sequences according to some embodiments of the present disclosure.

FIG. 6 is an example redundant data fabric for autonomous vehicle model training using low-discrepancy sequences. The redundant data fabric provides redundant data connection pathways between sensors 212 and CPU packages 204. In this example view, three CPU packages 204*a*, 204*b*, and 204*c* are connected to three sensors 212*a*, 212*b*, and 212*c* via three switched fabrics 213*a*, 213*b*, and 213*c*. Each CPU package 204*a*, 204*b*, and 204*c* is connected to a subset of the switched fabrics 213*a*, 213*b*, and 213*c*. For example, CPU package 204*a* is connected to switched fabrics 213*a* and 213*c*, CPU package 204*b* is connected to switched fabrics 213*a* and 213*b*, and CPU package 204*c* is connected to switched fabrics 213*b* and 213*c*. Each switched fabric 213*a*. 213*b*, and 213*c* is connected to a subset of the sensors 212*a*, 212*b*, and 212*c*. For example, switched fabric 213*a* is connected to sensors 212*a* and 212*b*, switched fabric 213*b* is connected to sensor 212*b* and 212*c*, and switched fabric 213*c* is connected to sensors 212*a* and 212*c*. Under this topology, each CPU package 204*a*, 204*b*, and 204*c* has an available connection path to any sensor 212*a*, 212*b*, and 212*c*. It is understood that the topology of FIG. 6 is exemplary, and that CPU packages, switched fabrics, sensors, or connections between components may be added or removed while maintaining redundancy. This example redundant data fabric improves the safety and reliability of the autonomous vehicle 100 by allowing for the use of redundant sensors and processors that may be dynamically linked via the redundant data fabric in response to an error or other condition.

Figure 7:
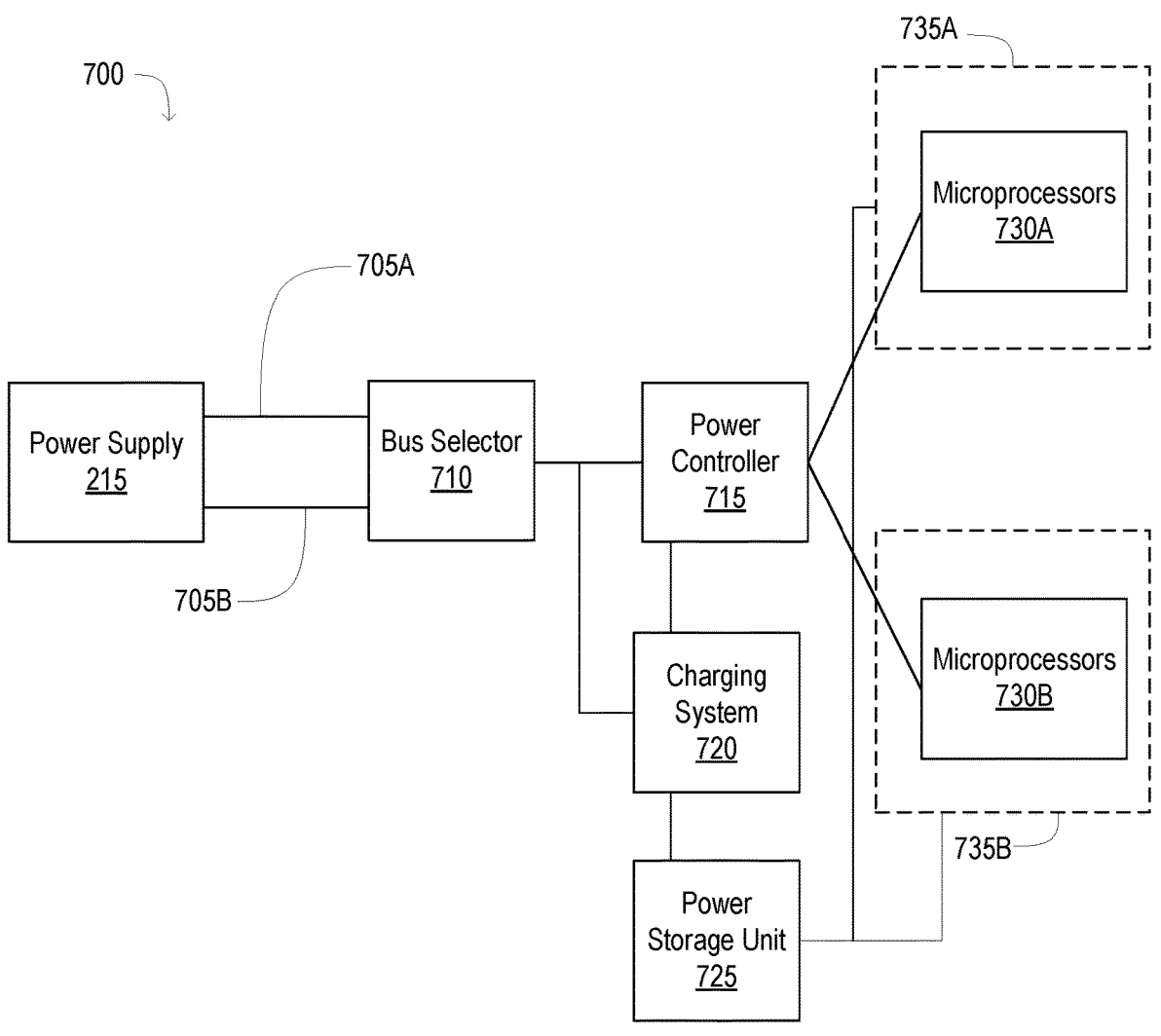
FIG. 7 is a block diagram of a system for redundantly supplying power to one or more computing devices according to some embodiments of the present disclosure.

For further explanation, FIG. 7 shows a block diagram of a system 700 for redundantly supplying power to one or more microprocessors 730A and one or more microprocessors 730B. In various embodiments, the system 700 is included in an autonomous vehicle 100, as further described above in conjunction with FIG. 1. For example, the microprocessors 730A, 730B are CPU packages 204 further described above in conjunction with FIG. 2. However, in other embodiments, the system 700 is included in another device or another system to provide redundant power to one or more microprocessors 730A, 730B.

The power supply 215 supplies voltage and current to components of the system 700. In various embodiments, the power supply 215 is a battery, a capacitor, or another charge source, or any of a combination of these. However, other power sources comprise the power supply 215 in various embodiments. In embodiments where the power supply 215 is included in an autonomous vehicle 100, such as the autonomous vehicle further described above in conjunction with FIGS. 1-5, the power supply 215 is an alternator driven by an internal combustion engine of the autonomous vehicle 100 or another device driven by the engine of the autonomous vehicle 100. In other embodiments, the power supply 215 is a power supply of the autonomous vehicle 100, such as a battery of the autonomous vehicle 100. For example, the power supply 215 is an ignition battery of the autonomous vehicle 100. As another example, the power supply 215 is an electric vehicle battery (or traction battery) of an electric autonomous vehicle 100 or of a hybrid autonomous vehicle 100. In some embodiments, the power supply 215 is an extension of a power system of an autonomous vehicle 100. However, in other embodiments, the power supply 215 is independent form the power supply 215 of the electric vehicle.

For purposes of illustration, FIG. 7 shows a single power supply 215. However, in other embodiments, the system 700 includes multiple power supplies 215. In embodiments where the system 700 is included in an autonomous vehicle 100, one power supply 215 is an extension of the power system of the autonomous vehicle 100, while a different power supply 215 is independent from the power system of the autonomous vehicle 100. In some embodiments, different power supplies 215 have different types. For example, a first power supply 215 is a battery, while a second power supply 215 is a capacitor or any of the other power sources as described elsewhere. As another example, a first power supply 215 is driven by an engine of the autonomous vehicle 100, while a second power supply 215 is a battery (or a capacitor) that is independent of the engine of the autonomous vehicle 100.

A plurality of buses 705A, 705B (also referred to individually or collectively using reference number 705) are coupled to the power supply 215 and to a bus selector 710. Each bus 705A, 705B is coupled to both the power supply 215 and to the bus selector 710. Further, different buses 705A, 705B are independent of each other. A bus 705 directs power from the power supply 215 to the bus selector 710, so a bus comprises an electrical connection between the power supply 215 and the bus selector 710. While FIG. 7 shows an embodiment with two buses 705A, 705B, in other embodiments, different numbers of buses 705 are included in the system 700. For example, various embodiments include three buses 705, four buses 705, five buses 705, or any other number of buses 705.

In some embodiments, each bus 705 includes a protection system, or is coupled to a protection system, configured to prevent high-energy transient pulses from traveling from the power supply 215 through a bus 705 to other components of the system 700. For example, the protection system includes a switch configured to disconnect the power supply 215 from the bus 705 in response to the protection system detecting a voltage on the bus 705 exceeding a threshold. In another embodiments, the protection system includes a transient voltage suppressor diode. As another example, the protection system including a transient voltage suppressor diode and a switch configured to disconnect the power supply 215 from the bus 705 in response to the protection system detecting a voltage on the bus 705 exceeding a threshold. In other examples, the protection system includes a buck regulator or a buck-boost regulator. A protection system coupled to a bus 705 also protects components of the system 700 from reverse voltage or overcurrent. For example, the protection system includes an ideal diode controller or one or more other components to protect from reverse voltage. In embodiments where the power supply 215 is a direct current (DC) source, the protection system also protects components of the system 700 from alternating current (AC) superimposed on the output of the DC source. For example, the protection system includes an active rectifier controller to remove a superimposed AC signal from a DC output of the power supply 215. A protection system is coupled to the bus 705 and to the bus selector 710, so voltage or current from the power supply 215 is directed through the bus protection system before reaching the bus selector 710.

Further, each bus 705 is coupled to a filter in some embodiments. When a bus 705 is coupled to a filter, voltage or current from the power supply 215 travels through the filter via the bus 705, with an output of the filter coupled to the bus selector 710. The filter removes or attenuates electromagnetic interference, such as electromagnetic interference from switching currents or from switching voltages included in the system 700. In various embodiments, the filter removes electromagnetic interference having frequencies within a particular range of frequencies.

The bus selector 710 is coupled to each bus 705A, 705B. The bus selector 710 is one or more integrated circuits or other logic circuits that selects one of the buses 705A, 705B as an output. In some embodiments, the bus selector 710 comprises one or more transistors and logic circuitry configured to select one of bus 705A and bus 705B as an output based on characteristics of voltage or current detected along bus 705A and bus 705B. For example, the bus selector 710 selects bus 705A as output in response to the bus selector 710 detecting a higher voltage on bus 705A than on bus 705B. Similarly, the bus selector 710 selects bus 705B as output in response to the bus selector 710 detecting a higher voltage on bus 705B than on bus 705A. In various embodiments, the bus selector 710 selects whichever bus 705 coupled to the bus selector 710 having a highest voltage as the output of the bus selector 710. In some embodiments, the bus selector 710 associates a priority level with each bus 705 coupled to the bus selector 710 and accounts for the priority level of each bus 705, as well as a voltage (or a current), of each bus 705 when selecting a bus 705 as the output of the bus selector 710. For example, the bus selector 710 selects a bus 705 having a highest voltage and associated with a highest priority level as the output of the bus selector 710.

As described herein, the bus selector 710 provides a single output selected from multiple buses 705 coupled to the bus selector 710.

The output of the bus selector 710 is coupled to a power controller 715, which is also coupled to a power storage unit 725. In some embodiments, the output of the bus selector 710 is coupled to the power storage unit 725. However, in other embodiments, such as the embodiment shown in FIG. 7, the output of the bus selector 710 is coupled to a charging system 720, with the charging system 720 coupled to the power storage unit 725. In some embodiments, the power controller 715 is coupled to the charging system 720, with the charging system 720 coupled to the power storage unit 725. However, in other embodiments, the power controller 715 is directly coupled to the power storage unit 725, and the output of the bus selector 710 is coupled to the charging system 720. In another embodiment, the power controller 715 is directly coupled to the power storage unit 725 and the output of the bus selector 710 is also directly coupled to the power storage unit 725. The power controller 715 is a microcontroller, processor, logical circuit, field-programmable gate array (FPGA), or other structure configured to select a power output as one of the output of the bus selector 710 and the power storage unit 725.

The power controller 715 selects the power output based on the output of the bus selector 710. In various embodiments, the power controller 715 selects the power output based on a voltage of the output of the bus selector 710. For example, the power controller 715 selects the power output as the output of the bus selector 710 in response to determining the voltage of the output of the bus selector 710 is at least a threshold voltage. In the preceding example, the power controller 715 selects the power output as an output of the power storage unit 725 in response to determining the voltage of the output of the bus selector 710 is less than the threshold voltage. In some embodiments, the threshold voltage is specified based on power consumption by microprocessors 730A, 730B coupled to the power controller 715. For example, the threshold voltage is a voltage sufficient to operate at least one of microprocessor 730A or microprocessor 730B. In some embodiments, the threshold voltage is specified as a voltage sufficient to operate microprocessor 730A or microprocessor 730B for at least a threshold amount of time. The threshold voltage is stored in a memory of the power controller 715 in various embodiments, allowing different systems 700 to specify different threshold voltages for selecting the power output of the power controller 715. Such embodiments allow the power controller 715 to prevent the power output from falling below the threshold voltage.

The charging system 720 provides power from the output of the bus selector 710 to the power storage unit 725. This causes the output of the bus selector 710 to charge the power storage unit 725, allowing the power storage unit 725 to store power from the power supply 215 received via the output of the selector 710. In various embodiments, the charging system 720 includes buck-boost charging circuitry that charges the power storage unit 725. Inclusion of buck-boost charging circuitry allows the charging system 720 to charge power storage units 725 having different storage capacities (e.g., power storage units 725 having different voltages). However, in other embodiments, the charging system 720 includes different charging circuitry for charging the power storage unit 725.

In some embodiments, the charging system 720 obtains charging information from the power storage unit 725 and adjusts charging of the power storage unit 725 accordingly.

For example, the charging system 720 obtains a current voltage from the power storage unit 725 and determines whether a current voltage of the power storage unit 725 is less than a threshold voltage. In response to determining the current voltage of the power storage unit 725 is less than the threshold voltage, the charging system 720 directs power from the output of the bus selector 710 to the power storage unit 725. In response to determining the current voltage of the power storage unit 725 equals the threshold voltage, the charging system 720 stops directing power from the output of the bus selector 710 to the power storage unit 725. In some embodiments, the charging system 720 periodically compares a voltage of the power storage unit 725 to the threshold voltage to determine whether to direct power from the output of the bus selector 710 to the power storage unit 725. In other embodiments, the charging system 720 continuously compares a voltage of the power storage unit 725 to the threshold voltage to determine whether to direct power from the output of the bus selector 710 to the power storage unit 725. In some embodiments, the threshold voltage stored by the power storage unit 725 is determined based on the microprocessor 730A or by the microprocessor 730B coupled to the power controller 715. For example, the threshold voltage is a voltage sufficient to operate at least one of the microprocessor 730A or the microprocessor 730B. As an example, the threshold voltage stored by the power storage unit 725 is a voltage sufficient to operate at least one of the microprocessor 730A or the microprocessor 730B for at least a threshold amount of time. This allows the power storage unit 725 to store adequate voltage to be an alternative power source for operating the microprocessor 730A or the microprocessor 730B when the output of the bus selector 710 is insufficient for powering the microprocessor 730A or the microprocessor 730B.

Further, in some embodiments the charging system 720 obtains a temperature of the power storage unit 725. For example, the charging system 720 includes a thermocouple that is thermally coupled to the power storage unit 725 to determine a temperature of the power storage unit 725. As another example, the charging system 720 is coupled to an infrared thermometer that is directed to the power storage unit 725 to capture the temperature of the power storage unit 725. The charging system 720 compares the temperature of the power storage unit 725 to a maximum temperature and stops directing power from the output of the bus selector 710 to the power storage unit 725 in response to the temperature of the power storage unit 725 equaling or exceeding the maximum temperature. While the temperature of the power storage unit 725 is less than the maximum temperature, the charging system 720 directs power from the output of the bus selector 710 to the power storage unit 725. Accounting for the temperature of the power storage unit 725 allows the charging system 720 to prevent the power storage unit 725 from overheating when being charged by the output of the bus selector 710. In some embodiments, the charging system 720 accounts for both the current voltage stored by the power storage unit 725 and the temperature of the power storage unit 725. For example, the charging system 720 directs power from the output of the bus selector 710 to the power storage unit 725 when both the temperature of the power storage unit 725 is less than the maximum temperature and the current voltage of the power storage unit 725 is less than the threshold voltage. In the preceding example, the charging system 720 stops directing power from the output of the bus selector 710 when the temperature of the power storage unit 725 is not less than the maximum temperature or when the current voltage of the power storage unit equals or exceeds the threshold voltage.

In some embodiments, the power controller 715, rather than the charging system 720, determines whether to direct power from the output of the bus selector 710 to the power storage unit 725. For example, the power controller 715 is coupled to the power storage unit 725 and to the output of the power storage unit 725. In such configurations, the power controller 715 obtains a current voltage of the power storage unit 725 and directs power from the output of the bus selector 710 in response to the current voltage of the power storage unit 725 being less than the threshold voltage, as further described above. The power controller 715 obtains a temperature of the power storage unit 725 and stops directing power from the output of the bus selector 710 in response to the temperature of the power storage unit 725 equaling or exceeding a maximum temperature, as further described above. In some embodiments the power controller 715 directs or stops directing power from the output of the bus selector 710 to the power storage unit 725, allowing the power controller 715 to regulate charging of the power storage unit 725 and to determine whether the power output is from the power storage unit 725 or is from the output of the bus selector 710.

The power storage unit 725 is a device configured to store power. Examples of the power storage unit 725 include a battery or a capacitor. In various embodiments, the power storage unit 725 is configured to store a minimum voltage for operating at least one of the microprocessor 730A or the microprocessor 730B. For example, the power storage unit 725 is configured to store a voltage capable of operating at least one of the microprocessor 730A or the microprocessor 730B for at least a threshold amount of time. The power storage unit 725 receives power from the output of the bus selector 710, so the power storage unit 725 accumulates power received from output of the bus selector 710. This allows the power storage unit 725 to act as an alternative power source that is charged while at least one of the buses 705 is supplying power as the output of the bus selector 710 and is used when the output of the bus selector 710 satisfies one or more criteria (e.g., when the output of the bus selector 710 has less than a threshold voltage). In different embodiments, the power storage unit 725 has different power storage capacities or charges at different rates. While FIG. 7 shows a single power storage unit 725 for purposes of illustration, in other embodiments, the system 700 includes multiple power storage units 725 coupled to the output of the bus selector 710 and to the power controller 715.

In some embodiments, a charge storage device (not shown) is coupled to the power controller 715. The charge storage device is coupled to the power controller 715 when the power controller 715 switches from selecting the output of the bus selector 710 from the output of the bus selector 710 to an output of the power storage unit and vice versa. Charge from the charge storage device is provided as the power output from the power controller 715 for an amount of time for the power controller 715 to select the appropriate source of the power output. For example, the charge storage device is a capacitor coupled to the power controller 715 when the power controller 715 is selecting the power output. The charge storage device allows the power output to remain uninterrupted to the first power domain 735A and to the second power domain 735B when the power controller 715 is switching to a different source of the power output than a current source of the power output.

The power controller 715 is coupled to a first power domain 735A including microprocessor 730A and to a second power domain 735B including microprocessor 730B. While FIG. 7 shows an example including two power domains, in other embodiments, additional power domains are coupled to the power controller 715 to increase redundancy. For example, the power controller 715 is coupled to three power domains, to four power domains, or to other numbers of power domains in different embodiments. In some embodiments, a power domain 735A, 735B includes multiple microprocessors 730 on a single circuit board, such as a printed circuit board. Different microprocessors 730 in a power domain 735A, 735B provide different functionalities in different embodiments. For example, different microprocessors 730 in a power domain 735A, 735B provide control signals to different systems, such as different autonomous vehicle control systems 223, as further described below in conjunction with FIG. 10.

The power output selected by the power controller 715 is directed to at least one of the first power domain 735A or the second power domain 735B. In various embodiments, the power output is directed to a single power domain 735, with other power domains 735 not receiving power. In other embodiments, power is provided to a power domain 735A through the power output, with a portion of the power output sufficient for one or more microprocessors in the power domain 735B to operate in a standby mode directed to the power domain 735B In some embodiments, the power output selected by the power controller 715 is directed to both the first power domain 735A and to the second power domain 735B. The power output from the power controller 715 powers one or more microprocessors 730 in a power domain 735A, 735B that receives the power output. In various embodiments, the microprocessor 730A includes one or more processors configured to execute instructions stored in a memory coupled to the one or more processors. Similarly, the microprocessor 730B includes one or more additional processors configured to execute instructions stored in an additional memory coupled to the one or more additional processors. For example, the system 700 is included in an autonomous vehicle 100, and the microprocessor 730A included in the first power domain 735A is a microprocessor coupled to a braking electronic control unit of the autonomous vehicle 100 and microprocessor 730B in second power domain 735B is a second microprocessor coupled to the braking electronic control unit of the autonomous vehicle. In the preceding example, the system 700 provides autarchical power to the microprocessor and to the second microprocessor from the power supply 215 or from the power storage unit 725. The configuration described above in conjunction with FIG. 7 allows the power storage unit 725 to supply power to operate the microprocessor and the second microprocessor when the power supply 215 is unable to provide sufficient power to the microprocessor and to the second microprocessor. In some embodiments, the instructions stored in the additional memory are a functional duplicate of the instructions stored in the memory, allowing the microprocessor 730A and the microprocessor 730B to provide common functionality, providing redundancy between the first power domain 735A and the second power domain 735B.

While FIG. 7 shows an embodiment where the first power domain 735A includes a single microprocessor 730A, in other embodiments, the first power domain 735A includes any number of microprocessors 730A. Similarly, in embodiments other than the embodiment shown in FIG. 7, the second power domain 735B includes any number of microprocessors 730B. As further described below in conjunction with FIG. 9, in some embodiments where the system 700 is included in an autonomous vehicle 100, the first power domain 735A and the second power domain 735B each include one or more autonomous vehicle control systems 223. In embodiments where the first power domain 735A or the second power domain 735B include multiple microprocessors 730, the threshold voltage stored by the power storage unit 725 is determined based on a voltage for operating microprocessor 730 included in a single power domain 735. For example, the threshold voltage stored by the power storage unit 725 is a voltage sufficient to operate the one or more microprocessors 730A included in power domain 735A or sufficient to operate the one or more microprocessor 730B in power domain 735B. In another example, the threshold voltage stored by the power storage unit 725 is a voltage sufficient to operate the one or more microprocessors 730 in one power domain 735A, 735B and to allow one or more microprocessors 730 in a second power domain 735B. 735B to operate in a standby state. For example, in the standby state, one or more microprocessors 730 perform a set of computations or perform computations but do not generate output signals. As an example, the threshold voltage is a voltage sufficient for microprocessors 730 included in the first power domain 735A to operate with full functionality and for microprocessors 730 in the second power domain 735B to operate in a standby state. In another example, the threshold voltage is a voltage sufficient for microprocessors 730 in multiple power domains 735 to operate with full functionality. In various embodiments, the power storage unit 725 maintains a voltage sufficient for microprocessors 730 in at least one power domain 735A. 735B to provide full functionality, allowing at least one power domain 735A. 735B to provide full functionality (e.g., to provide output signals for controlling one or more systems).

In some embodiments, the power controller 715 activates connections from the power storage unit 725 to the first power domain 735A and to the second power domain 735B when the power controller 715 selects the power storage unit 725 as the power output. Activating the connections electrically couples the power storage unit 725 to the first power domain 735A and to the second power domain 735B. Alternatively, the power controller 715 routes power from the power storage unit 725 to the first power domain 735A and to the second power domain 735B through the power controller 715 and connections between the power controller 715 and the first power domain 735A and between the power controller 715 and the second power domain 735B.

In various embodiments, the one or more microprocessors 730A and the one or more microprocessors 730B provide common functionality to provide a measure of redundancy for the functionality. If the one or more microprocessors 730A are inoperable, the functionality provided the one or more microprocessors 730A is provided by the one or more microprocessors 730B. In some embodiments, the first power domain 735A and the second power domain 735B each include switching logic that redirects power from the power output based on one or more conditions. For example, switching logic in the first power domain 735A routes power that the first power domain 735A receives from the power output of the power controller 715 to the second power domain 735B in response to one or more microprocessors 730A in the first power domain 735A providing less than a threshold amount of functionality. For example, in response to at least a threshold number of microprocessors 730A in the first power domain 735A being inoperative, switching logic routes power from the first power domain 735A to the second power domain 735B. This allows the one or more microprocessors 730B in the second power domain 735B to provide the functionality previously provided by the one or more microprocessors in the first power domain 735A. In embodiments where a single power domain 735A, 735B receives the power output from the power controller 715, switching logic in the power domain 735A, 735B allows power received from the power domain 735A. 735B to be directed to another power domain 735A, 735B in response to one or more microprocessors 730 in the power domain 735A, 735B being unable to provide at least a threshold amount of functionality. This provides redundancy across multiple power domains 735 to maintain at least the threshold amount of functionality.

In various embodiments, output from a single power domain 735A, 735B is provided to one or more other systems. For example, instructions are output from a single power domain 735A, 735B to one or more control systems, while other power domains 735 do not output instructions to the control systems. This results in a single power domain 735A, 735B providing output at a particular time, while other power domains 735 do not provide output at the particular time.

In some embodiments, the power controller 715 includes the switching logic to direct the power output to power domains 735 based on functionality provided by microprocessors 730 included in different power domains 735, allowing the power controller 715 to reroute the power output to different power domains 735. For example, in response to the power controller 715 not receiving a signal from the first power domain 735A, the power controller 715 reroutes the power output from the first power domain 735A to the second power domain 735B. Such rerouting increases the power routed to the second power domain 735B via the power output, allowing one or more microprocessors 730B in the second power domain 735B to provide increased functionality. In other embodiments, the power controller 715 reroutes the power output from the first power domain 735A to the second power domain 735B in response to receiving a signal from the first power domain 735A. In various embodiments, both the first power domain 735A and the second power domain 735B include microprocessors 730 that are capable of completing a specific set of actions, such as actions comprising a minimal risk condition as further described below in conjunction with FIG. 10. In other embodiments, both the first power domain 735A and the second power domain 735B include microprocessors that are capable of completing the minimal risk condition, as further described below in conjunction with FIG. 10. For example, microprocessors 730A in the first power domain 735A execute different instructions than microprocessors 730B in the second power domain 735B, but the instructions executed by microprocessors 730A or by microprocessors 730B provide common functionality (e.g., both microprocessors 730A and microprocessors 730B execute instructions for completing a minimal risk condition for an autonomous vehicle, while different microprocessors may execute different instructions to complete the minimal risk condition). This allows a power domain 735A, 735B to which the power output is routed to perform the specific set of actions when receiving power. For example, when a connection to one or more microprocessors 730A in the first power domain 735A is damaged or loose, the one or more microprocessors 730A receive less than a threshold amount of power (e.g., voltage), preventing the first power domain 735A from completing the specific set of actions. In response to the one or more microprocessors 730A receiving less than the threshold amount of power, the power controller 715 reroutes the power output from the first power domain 735A to the second power domain 735B. This increases power to the second power domain 735B, allowing the second power domain 735B to complete the specific set of actions when the first power domain 735A is unable to complete the specific set of actions.

Figure 8:
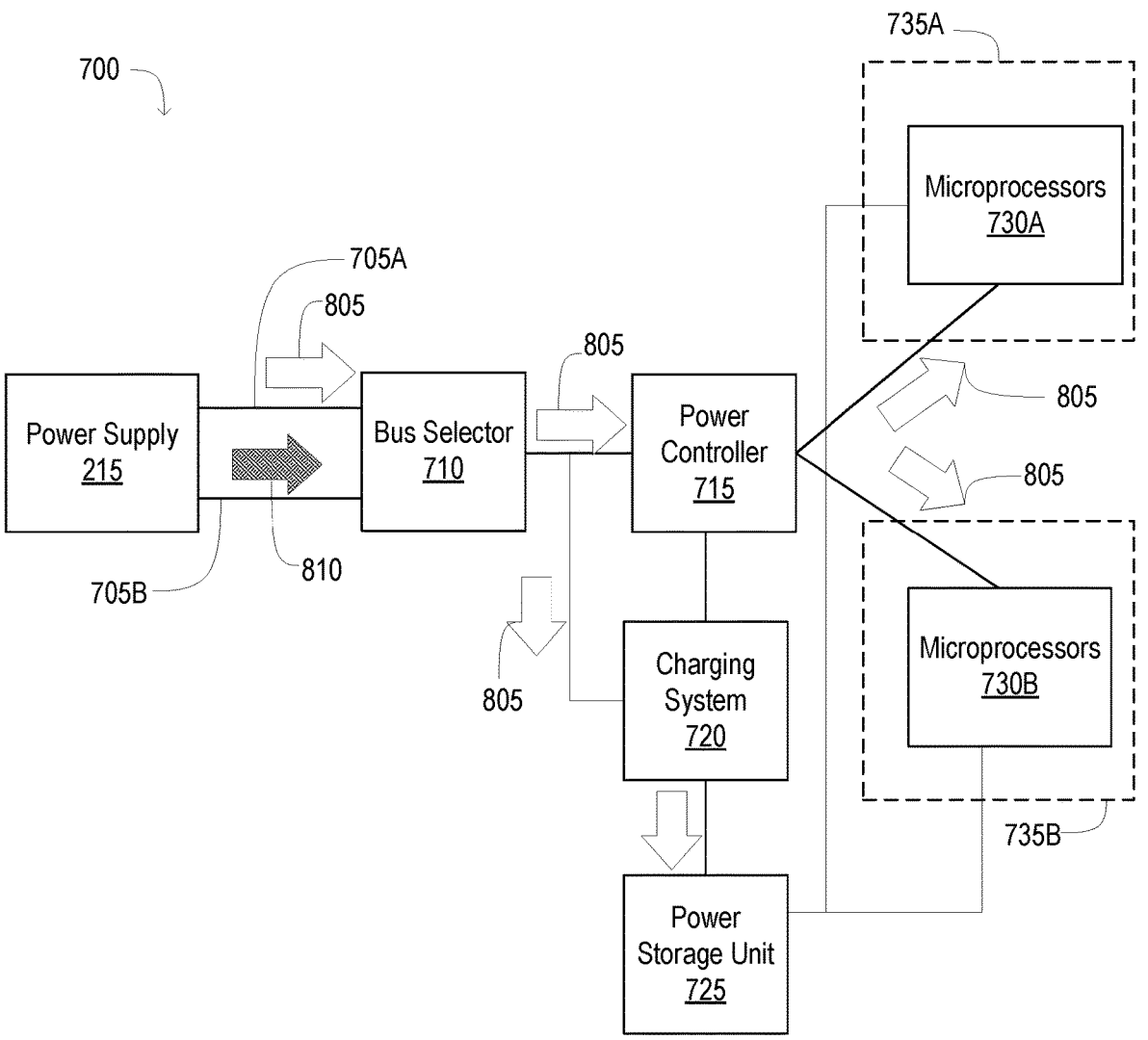
FIG. 8 is a process flow diagram of a system for redundantly supplying power to one or more computing devices from a power supply according to some embodiments of the present disclosure.
Figure 9:
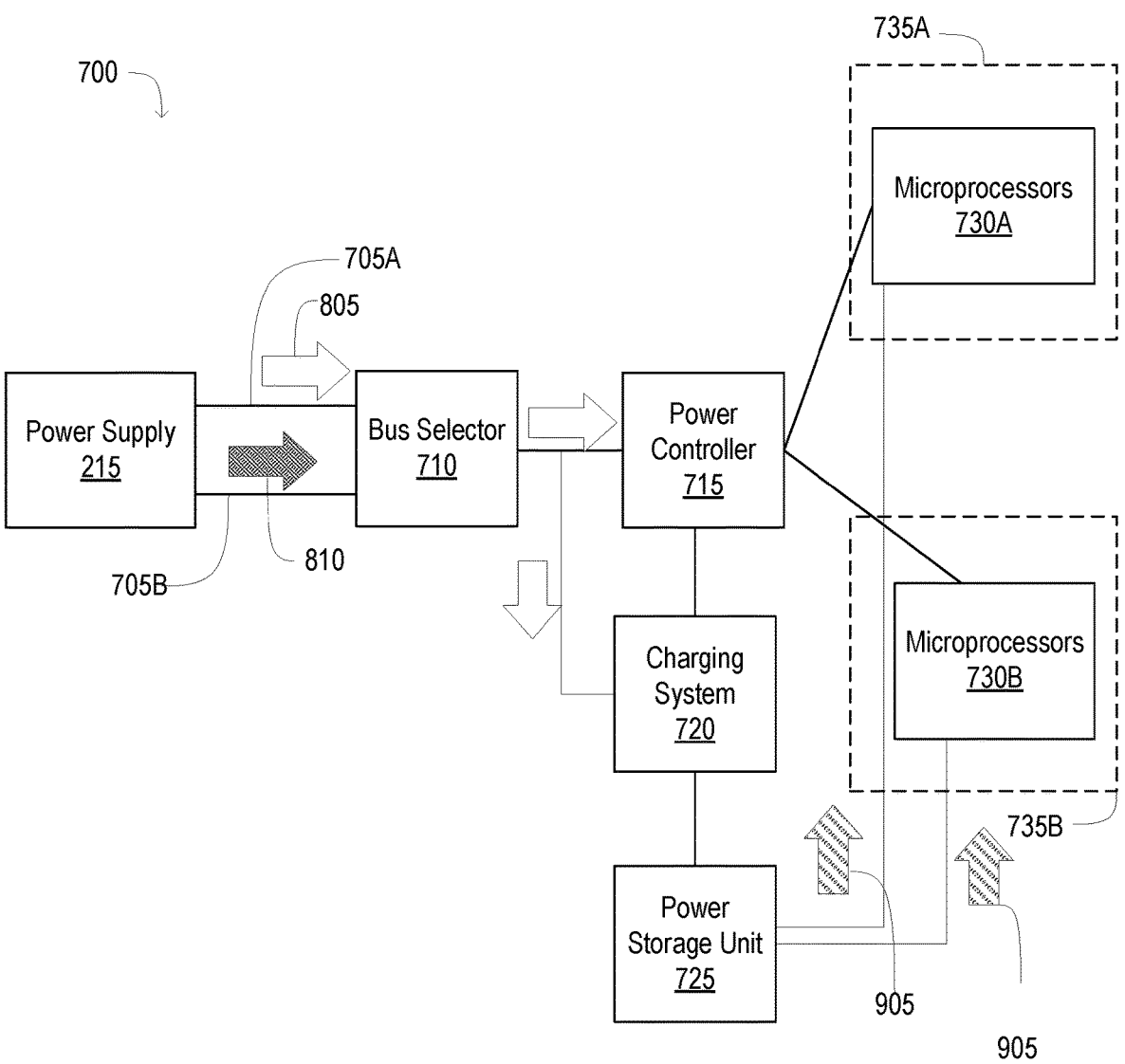
FIG. 9 is a process flow diagram of a system for redundantly supplying power to one or more computing devices from a charge storage unit according to some embodiments of the present disclosure.

For purposes of illustration, FIGS. 8 and 9 are process flow diagrams showing operation of the system 700 for supplying power to one or more microprocessors 730A, 730B. As shown in FIG. 8, bus 705A directs a first power flow 805 from the power supply 215 to the bus selector 710. Similarly, bus 705B directs a second power flow 810 from the power supply 215 to the bus selector 710. The first power flow 805 and the second power flow 810 supplies voltage or current from the power supply 215 to the bus selector 710. Based on one or more characteristics of the first power flow 805 and the second power flow 810, the bus selector 710 selects one of bus 705A or bus 705B as an output. For example, the bus selector 710 selects bus 705A as output in response to the bus selector 710 detecting a higher voltage from the first power flow 805 via bus 705A than on the second power flow 810 received bus 705B. Similarly, the bus selector 710 selects bus 705B as output in response to the bus selector 710 detecting a higher voltage from the second power flow 810 via bus 705B than from the first power flow 805 via bus 705A. The bus selector 710 may use different characteristics, or combinations of characteristics, of the first power flow 805 and of the second power flow 810 to determine whether to select bus 705A or bus 705B.

In some embodiments, the bus selector 710 maintains one or more timing criteria, and accounts for the timing criteria, as well as characteristics of the first power flow 805 and characteristics of the second power flow 810, when selecting between bus 705A and bus 705B. For example, the bus selector 710 maintains an amount of time that a bus 705 has been selected as the output of the bus selector 710 and a threshold time interval. In response to the amount of time that a bus 705 has been selected as the output of the bus selector 710 equaling or exceeding the threshold time interval, the bus selector 710 changes the output of the bus selector 710 to an alternative bus 705. In some embodiments, the bus selector 710 changes the output of the bus selector 710 from a bus 705A to an alternative bus 705B in response to a voltage difference (or a current difference) between the first power flow 805 on bus 705A and the second power flow 810 on bus 705B not exceeding a threshold amount and in response to the bus output having been bus 705A for at least the threshold time interval. Accounting for an amount of time a bus 705 has been the output of the bus selector 710 allows the bus selector 710 to periodically switch between which bus 705 is the output of the bus selector 710.

In the example of FIG. 8, the bus selector 710 selects bus 705A as the output. This selection causes the first power flow 805 to be output from the bus selector 710. The first power flow 805 is directed from the bus selector 710 to the power controller 715 and to the charging system 720 in the embodiment shown by FIG. 8. In other embodiments, the first power flow 805 is directed from output of the bus selector 710 output to the power storage unit 725 and to the power controller 715. As further described above in conjunction with FIG. 7, power from the first power flow 805 charges the power storage unit 725.

As further described above in conjunction with FIG. 7, the power controller 715 selects a power output based on the output of the bus selector 710. In various embodiments, the power controller 715 selects the power output based on a voltage of the output of the bus selector 710. For example, the power controller 715 selects the power output as the output of the bus selector 710 in response to determining the voltage of the output of the bus selector 710 is at least a threshold voltage. In the example shown by FIG. 8, the power controller 715 determines the voltage of the first power flow 805, which is the output of the bus selector 710, has at least the threshold voltage. In FIG. 8, the power output is the first power flow 805, which is directed from the power controller 715 to the first power domain 735A and to the second power domain 735B.

For purposes of illustration, FIG. 9 shows bus 705A directing the first power flow 805 from the power supply 215 to the bus selector 710. Similarly, bus 705B directs the second power flow 810 from the power supply 215 to the bus selector 710. The bus selector 710 in the example of FIG. 9 also selects bus 705A as the output of the bus selector 710. This causes the bus selector 710 to direct the first power flow 805 to the power controller 715 and to the charging system 720 (or to the power storage unit 725).

However, in the example of FIG. 9, the power controller 715 selects the power output as the power storage unit 725. For example, the power controller 715 determines that the voltage of the first power flow 805 is less than the threshold voltage, so the power controller 715 selects the power storage unit 725 as the power output. Selection of the power storage unit 725 as the power output causes an alternative power flow 905 from the power storage unit to be directed to the first power domain 735A and to the second power domain 735B. As further described above in conjunction with FIG. 7, the threshold voltage is based on voltage sufficient to operate one or more microprocessors 730A in the first power domain 735A and to operate one or more microprocessors 730B in the second power domain 735B. The power controller 715 selects the power storage unit 725 as the power output in response to a voltage of the output of the bus selector (i.e., the first power flow 805 in FIG. 9) being insufficient to operate one or more microprocessors 730A in the first power domain 735A and to operate one or more microprocessors 730B in the second power domain 735B.

In the example of FIG. 9, the alternative power flow 905 is directed from the power storage unit 725 to the first power domain 735A through one or more connections between the power storage unit 725 and one or more microprocessors 730A in the second power domain. Similarly, the alternative power flow 905 is directed to the second power domain 735B through one or more connections between the power storage unit 725 and one or more microprocessors 730B in the second power domain 735B. However, in other embodiments, the alternative power flow 905 is directed from the power storage unit 725 to the power controller 715, with connections between the power controller 715 and the first power domain 735A and the second power domain 735B directing the alternative power flow 905 from the power storage unit 725 to the first power domain 735A and to the second power domain 735B.

Figure 10:
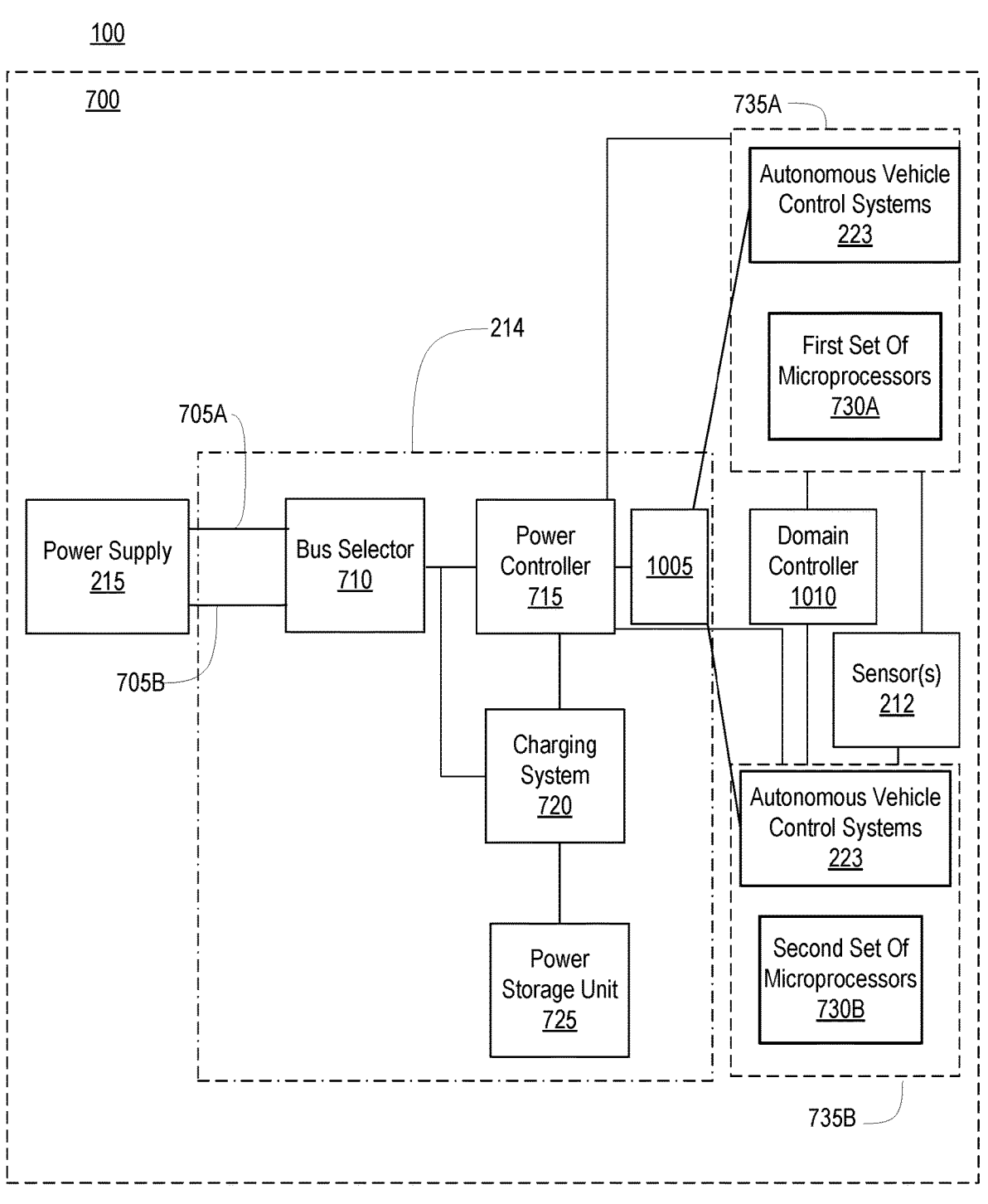
FIG. 10 is a block diagram of an autonomous vehicle including a system for redundantly supplying power to one or more central processing unit packages and to one or more autonomous vehicle control systems according to some embodiments of the present disclosure.

In various implementations, the system 700 is included in an autonomous vehicle 100, as further described above in conjunction with FIG. 1. For example, the system 700, further described above in conjunction with FIGS. 7-9 couples the power supply 215 to one or more microprocessors 730A, 730B or to one or more autonomous vehicle control systems 223, as further described above in conjunction with FIGS. 1 and 2. For further illustration, FIG. 10 is a block diagram of an autonomous vehicle 100 including a system 700 for redundantly supplying power to one or more microprocessors 730A. 730B and to one or more autonomous vehicle control systems 223. As shown in FIG. 10, the system 700 further described above in conjunction with FIGS. 7-9 couples a power supply 215 to one or more microprocessors 730A, 730B. In further embodiments, the system 700 includes one or more sensors 212 of the autonomous vehicle 100 in a power domain 735, so the system 700 couples the power supply 215 to one or more sensors 212 of the autonomous vehicle 100 in some embodiments. For clarity, components of the autonomous vehicle 100 further described above in conjunction with FIGS. 1 and 2 are not reproduced in FIG. 10.

As shown in FIG. 10, the system 700 includes a plurality of buses 705A, 705B (also referred to individually and collectively using reference number 705). Each bus 705 is coupled to the power supply 215 and to a bus selector 710, as further described above in conjunction with FIG. 7. Further, each bus 705 of the plurality of buses 705 is independent of other buses 705 of the plurality of buses 705. As further described above in conjunction with FIG. 7, the bus selector 710 selects one of the plurality of buses 705 as an output of the bus selector 710. For example, the bus selector 710 selects a bus 705 having a maximum voltage (or a maximum current) as the output of the bus selector 710.

The output of the bus selector 710 is directed to a power controller 715 and to a charging system 720 in the embodiment shown in FIG. 10. The charging system 720 charges the power storage unit 725 using power from the output of the bus selector 710, as further described above in conjunction with FIG. 10. Power from the power supply 215 is used to accumulate charge in the power storage unit 725. While FIG. 10 depicts an embodiment where the output of the bus selector 710 is coupled to the charging system 720, in other embodiments, the output of the bus selector 710 is directly coupled to the power storage unit 725. In other embodiments, power from the bus selector 710 is directed from the output of the bus selector 710 to the power controller 715 and from the power controller 715 to the power storage unit 725. Additionally, in some embodiments, the charging system 720 is coupled to the power controller 715, while in other embodiments the power controller 715 is not coupled to the charging system 720.

Based on characteristics of the output of the bus selector 710, the power controller 715 selects a power output. The power controller 715 selects either the output of the bus selector 710 or the power storage unit 725 as the power output. In various embodiments, the power controller 715 selects the power output based on one or more characteristics of the output of the bus selector 710. For example, the power controller 715 compares a voltage of the output of the bus selector 710 to a threshold voltage. In response to determining the output of the bus selector 710 has a voltage equaling or exceeding the threshold voltage, the power controller 715 selects the power output as the output of the bus selector 710, as further described above in conjunction with FIGS. 7 and 9. However, in response to determining the output of the bus selector 710 has a voltage less than the threshold voltage, the power controller 715 selects the power storage unit 725 as the power output, as further described above in conjunction with FIGS. 7 and 9. Charging the power storage unit 725 using power from the power supply 215 via the bus selector 710 allows the power storage unit 725 to function as an alternative power source when the power supply 215 provides less than a threshold voltage.

In some embodiments, in response to selecting the power storage unit 725 as the power output, the power controller 715 transmits an instruction to one or more driver notification systems of the autonomous vehicle 100. In response to receiving the instruction, the one or more driver notification systems present one or more notifications to a driver of the autonomous vehicle that the power storage unit 725 is powering one or more microprocessors 730A, 730B. For example, a warning light or a warning message is displayed to the driver via a display of the autonomous vehicle 100 visible to the driver. In another example, a sound system of the autonomous vehicle 100 plays a warning message or a specific sound to indicate to the driver that the power storage unit 725 is powering one or more microprocessors 730A, 730B. In another example, a driver notification system provides haptic feedback to the driver via the steering wheel of the autonomous vehicle 100 or through a seat of the autonomous vehicle 100 in response to receiving the instruction from the power controller 715. Notifications may be continuously provided to the driver, provided to the driver at periodic intervals, or provided to the driver when the power controller 715 initially selects the power storage unit 725 as the power output. Providing one or more notifications to the driver allows the power controller 715 to notify the driver when a bus 705 is no longer powering one or more microprocessors 730A, 730B, indicating to the driver that the one or more microprocessors 730A, 730B are drawing from a power sourced with reduced capacity relative to the bus 705.

The power output selected by the power controller 715 is routed to a first power domain 735A and to a second power domain 735B. In the embodiment shown by FIG. 10, power domain 735A includes a first set of microprocessors 730A that are coupled to at least a collection of autonomous vehicle control systems 223. Similarly, power domain 735B includes a second set of microprocessors 730B that are also coupled to at least the collection of autonomous vehicle control systems 223. In some embodiments, one or more of the autonomous vehicle control systems 223 are included in the first power domain 735A and in the second power domain 735B. In such embodiments, the power output from the power controller 715 provides power to the autonomous vehicle control systems 223 included in the first power domain 735A and to the autonomous vehicle control systems 223 included in the second power domain 735B.

In various embodiments, the first set of microprocessors 730A or the second set of microprocessors 730B provide instructions for controlling movement of the autonomous vehicle 100 when the autonomous vehicle 100 is an autonomous mode. For example, the first set of microprocessors 730A or the second set of microprocessors 730B provide instructions to the collection of autonomous vehicle control systems 223 controlling movement of the autonomous vehicle 100 when the autonomous vehicle 100 is in an autonomous mode. In some embodiments, the collection of autonomous vehicle control systems 223 included in the first power domain 735A and in the second power domain 735B determine a threshold voltage to be maintained by the power storage unit 725. For example, the threshold voltage included in the power storage unit 725 is a voltage sufficient to operate a set of microprocessors (the first set of microprocessors 730A or the second set of microprocessors 730B) coupled to at least the collection of autonomous vehicle control systems 223 for at least a threshold amount of time. In another example where one or more of the collection of autonomous vehicle control systems 223 are included in the first power domain 735A and in the second power domain 735B, the threshold voltage included in the power storage unit 725 is a voltage sufficient to operate at least one set of microprocessors 730A, 730B and the collection of autonomous vehicle control systems 223 for at least a threshold amount of time. The threshold amount of time is determined based on a time for the autonomous vehicle 100 to satisfy a minimal risk condition where the autonomous vehicle comes to a complete stop in some embodiments. In various embodiments, the minimal risk condition includes one or more actions to be performed for the autonomous vehicle 100 to be out of danger, as further described below.

In some embodiments, the minimal risk condition specifies the autonomous vehicle 100 moving to an emergency lane or otherwise out of a lane including moving traffic and stopped. In other embodiments, the minimal risk condition specifies the autonomous vehicle 100 travels an off ramp and comes to a stop. In other examples, the minimal risk condition specifies the autonomous vehicle 100 stays in a lane in which the autonomous vehicle 100 is currently travelling. As another example, a minimal risk condition specifies the autonomous vehicle 100 enters a lane for traffic moving at a slower speed. In another example, a minimal risk condition specifies the autonomous vehicle 100 perform autonomous control operations for a threshold amount of time to allow a driver to resume manual control of the autonomous vehicle 100. For another example, the minimal risk condition specifies the autonomous vehicle 100 come to a stop in a lane where the autonomous vehicle 100 is currently travelling. In other embodiments, the minimal risk condition specifies multiple actions for the autonomous vehicle to complete 100. For example, a minimal risk condition specifies the autonomous vehicle 100 complete a maneuver in progress, move to a different lane than a current lane, identify a location out of a flow of traffic (e.g., on a side of a road), come to a stop in the identified location, park, and turn on hazard lights. In different embodiments, different combinations of actions or actions are specified as the minimal risk condition; for example, different autonomous vehicles 100 store information identifying different vehicle-specific minimal risk conditions.

In various embodiments, the power storage unit 725 stores charge (e.g., voltage) sufficient for the microprocessors 730A, 730B or the collection of autonomous vehicle control systems 223 to complete a minimal risk condition, such as bringing the autonomous vehicle 100 to a complete stop. The autonomous vehicle 100 includes information identifying the minimal risk condition to be executed in various embodiments. In some embodiments, the autonomous vehicle 100 identifies the collection of autonomous vehicle control systems 223 for completing the minimal risk conditions. In various embodiments, a collection of autonomous vehicle control systems 223 for completing a minimal risk condition includes one or more autonomous vehicle control systems 223 capable of modifying movement of the autonomous vehicle 100. For example, the collection of autonomous vehicle control systems 223 includes a braking system and a steering system, with the braking system and the steering system stored in association with the minimal risk conditions. Different minimal risk conditions may be associated with different collections of autonomous vehicle control systems 223.

In some embodiments, the power storage unit 725 provides power to the microprocessors 730A, 730B in the first power domain 735A or in the second power domain 735B that provide control signals to at least the collection of the one or more autonomous vehicle control systems 223. The autonomous vehicle control systems 223 receives power for performing actions affecting movement of the autonomous vehicle 100 in various embodiments, with the power output from the power controller 715 used to power microprocessors 730A, 730B that provide control signals or instructions to the collection of autonomous vehicle control systems 223 while the autonomous vehicle 100 is in an autonomous mode. The collection of autonomous vehicle control systems 223 perform one or more actions based on the control signals or instructions from the first set of microprocessors 730A or from the second set of microprocessors 730B. For example, a microprocessor 730A, 730B receiving the power output provides instructions to a braking system that activates brakes of the autonomous vehicle 100 at a time and with a force specified by a control signal from the microprocessor 730A, 730B. Similarly, a microprocessor 730A, 730B receiving the power output provides instructions to a transmission system of the autonomous vehicle 100 that changes a gear in which the autonomous vehicle 100 operates based on the received instructions. The power storage unit 725 provides the power controller 715 with a source of power capable to power one or more microprocessors 730A, 730B in at least one power domain 735A. 735B to provide control signals to one or more autonomous vehicle control systems 223 so the autonomous vehicle 100 completes a minimal risk condition. In such embodiments, the power storage unit 725 maintains a threshold voltage sufficient for microprocessors 730A, 730B in at least one power domain 735A, 735B to operate at full functionality for an amount of time for the autonomous vehicle 100 to compete the minimal risk condition. As further described above, the collection of autonomous vehicle control systems 223 control movement of the autonomous vehicle 100. For example, the collection of autonomous vehicle control systems 223 control movement of the autonomous vehicle 100 based on instructions from a set of microprocessors 730A, 730B when the autonomous vehicle 100 is in an autonomous mode that allows the autonomous vehicle to handle the dynamic driving task. As another example, the collection of autonomous vehicle control systems 223 allows the autonomous vehicle 100 to complete a minimal risk condition by performing one or more movements or alternations in movement of the autonomous vehicle 100.

In various embodiments, a threshold amount of power stored in the power storage unit 725 is based on the minimal risk condition. For example, the power storage unit 725 stores a threshold amount of power for a power domain 735A, 735B to provide control signals to the collection of autonomous vehicle control systems 223 for a threshold amount of time, with the threshold amount of time determined based on an amount of time to complete the minimal risk condition. In another example, the power storage unit 725 stores a threshold amount of power for a power domain 735A, 735B to provide control signals to the collection of autonomous vehicle control systems 223 for performing a set of functions, such as the functions comprising the minimal risk condition. In some embodiments, the threshold amount of power stored in the power storage unit 725 is based on one or more autonomous vehicle control systems 223 included in the collection of autonomous vehicle control systems 223. For example, the power storage unit 725 includes a threshold amount of power sufficient to operate one or more microprocessors 730 in a power domain 735A, 735B and to operate one or more of the collection of autonomous vehicle control systems 223 for at least a threshold amount of time or for completion of a set of functions. In some embodiments, the power storage unit 725 maintains a threshold amount of power for operating one or more microprocessors 730 in a power domain to provide functionality for completing a minimum risk condition without providing power to one or more of the collection of autonomous vehicle control systems 223. In alternative embodiments, the power storage unit 725 includes a threshold amount of power for operating one or more microprocessors 730 in a power domain to provide functionality for completing a minimum risk condition and for powering the collection of autonomous vehicle control systems 223 (or powering a subset of the collection of autonomous vehicle control systems 223) to complete the minimal risk condition.

In other embodiments, the power output of the power controller 715 provides power to both microprocessors 730A, 730B and to the collection of autonomous vehicle control systems 223 coupled to the microprocessors 730A, 730B. In such embodiments, the power storage unit 725 has a threshold voltage that is sufficient to power microprocessors 730A, 730B in at least one power domain 735A, 735B for an amount of time for the autonomous vehicle 100 to complete a minimal risk condition and to power the collection of autonomous vehicle control systems 223 coupled to the microprocessors 730A. 730B in the power domain 735. In embodiments where the power storage unit 725 provides power to at least a collection of autonomous vehicle control systems 223 when selected by the power controller 715, the power controller 715 is coupled to a control bus 1005. The control bus 1005 comprises connections between the power controller 715 and each of at least the collection of autonomous vehicle control systems 223 to route power from the power storage unit 725 to at least the collection of autonomous vehicle control systems 223. Inclusion of the control bus 1005 simplifies routing of power from the power storage unit 725 to different autonomous vehicle control systems 223.

In some embodiments, the collection of autonomous vehicle control systems 223 include a collection of systems controlling movement of the autonomous vehicle 100 in addition to one or more lights of the autonomous vehicle 100. For example, the collection of autonomous vehicle control systems 223 include headlights of the autonomous vehicle 100, hazard lights of the autonomous vehicle 100, tail lights of the autonomous vehicle 100, or other lights of the autonomous vehicle 100. This allows at least some of the lights of the autonomous vehicle 100 remain operational by receiving power from one of the power domains 735, increasing safety of the autonomous vehicle 100 by maintaining operability of at least some of the lights of the autonomous vehicle 100.

Various autonomous vehicle control systems 223 are included in the first power domain 735A and in the second power domain 735B in different embodiments. For example, an autonomous vehicle control system 223 is a system configured to change a rate of speed of the autonomous vehicle 100; for example, an autonomous vehicle control system 223 is a throttle control system or an accelerator. As another example, an autonomous vehicle control system 223 is a braking system configured to change application of one or more brakes of the autonomous vehicle. In some embodiments, the braking system controls brakes coupled to both the front and the rear wheels of the autonomous vehicle 100. As another example, an autonomous vehicle control system 223 is a transmission of the autonomous vehicle 100 that changes a gear in which the autonomous vehicle 100 operates. As another example, an autonomous vehicle control system 223 is a steering system configured to change an orientation of the autonomous vehicle 100; for example, the steering system is coupled to one or more wheels of the vehicle and repositions the wheels to change a direction of the autonomous vehicle 100. Various combinations of autonomous vehicle control systems 223 or autonomous vehicle control systems 223 are included the first power domain 735A and in the second power domain 735B in various embodiments. Each autonomous vehicle control system 223 included in a power domain 735A, 735B is coupled to a microprocessor 730A, 730B in the power domain 735, with a microprocessor 730A, 730B providing control signals or instructions to the autonomous vehicle control system 223.

One or more systems of the autonomous vehicle 100 are excluded from the collection of autonomous vehicle control systems 223 coupled to the first power domain 735A and to the second power domain 735B. For example, the collection of autonomous vehicle control systems 223 excludes systems of the autonomous vehicle 100 that do not affect movement or functional safety requirements of the autonomous vehicle 100. In some embodiments, the collection of autonomous vehicle control systems 223 do not include a heating, ventilation, and air conditioning system of the autonomous vehicle 100. As another example, the collection of autonomous vehicle control systems 223 does not include an entertainment system of the autonomous vehicle 100. In various embodiments, different combinations of systems controlling movement of the autonomous vehicle 100 are included in the collection of autonomous vehicle control systems 223, allowing different embodiments to include different systems in the collection of autonomous vehicle control systems 223.

In various embodiments, the one or more microprocessors 730A, 730B in the first power domain 735A and the one or more microprocessors 730A, 730B in the second power domain 735B provide common functionality to provide a measure of redundancy for the functionality. The one or more microprocessors 730A, 730B in one of the power domains 735 is inoperable, the functionality provided the one or more microprocessors 730A, 730B in the power domain 735A. 735B is provided by the one or more microprocessors 730A, 730B in another power domain 735. As further described below, in some embodiments, a domain controller 1010 is coupled to the first power domain 735A and to the second power domain 735B. The domain controller 1010 includes switching logic that redirects power from the power output of the power controller 715 to the first power domain 735A or to the second power domain 735B based on one or more conditions. For example, the domain controller 1010 routes power that the first power domain 735A receives from the power output of the power controller 715 to the second power domain 735B in response to one or more microprocessors 730A. 730B in the first power domain 735A providing less than a threshold amount of functionality. For example, in response to at least a threshold number of microprocessors 730A, 730B in the first power domain 735A being inoperative, the domain controller 1010 routes power from the first power domain 735A to the second power domain 735B. This allows the one or more microprocessors 730A, 730B in the second power domain 735B to provide the functionality previously provided by the one or more microprocessors 730A, 730B in the first power domain 735A. In embodiments where a single power domain 735A. 735B receives the power output from the power controller 715, switching logic in the domain controller 1010 allows power received from the power domain 735A, 735B to be directed to another power domain 735A, 735B in response to one or more microprocessors 730 in the power domain 735A. 735B being unable to provide at least a threshold amount of functionality. This provides redundancy across multiple power domains 735 to maintain at least the threshold amount of functionality for microprocessors 730A, 730B. In various embodiments, the microprocessors 730A,

730B in the power domains 735 provide instructions or control signals to one or more autonomous vehicle control systems 223, with the redundancy provided by the system 700 allowing microprocessors 730A, 730B in at least one power domain 735A, 735B to continue receiving power for providing the instructions or the control signals to the corresponding autonomous vehicle control systems 223.

The power storage unit 725 stores an amount of power sufficient to operate least one of the first power domain 735A or the second power domain 735B so at least the collection of autonomous vehicle control systems 223 remain operational for an amount of time needed to stop the autonomous vehicle 100. This allows the power storage unit 725 to ensure operation of at least one power domain 735A. 735B until the autonomous vehicle 100 stops if the power supply 215 is unable to provide sufficient power to operate a power domain 735. In embodiments where the power controller 715 also couples the power storage unit 725 to one or more autonomous vehicle control systems 223, the power storage unit 725 allows the autonomous vehicle control systems 223 to remain operational when the power supply 215 provides insufficient power, enabling the autonomous vehicle control systems 223 to bring the autonomous vehicle to a stop.

In some embodiments, the power controller 715 monitors power provided to systems of the autonomous vehicle 100 other than the autonomous vehicle control systems 223 via the control bus 1005. In response to determining less than a threshold amount of power is available to, or is received by, a system of the autonomous vehicle 100, the power controller 715, the power controller 715 directs at least a portion of the power output from the power controller 715 to the one or more systems of the autonomous vehicle 100. When the power output selected by the power controller 715 is the power storage unit 725, the one or more systems of the autonomous vehicle 100 receive power from the power storage unit 725 via the power output of the power controller 715 and the control bus 1005. This allows the one or more systems of the autonomous vehicle 100 to receive power when another source of power for the one or more systems of the autonomous vehicle 100 is unavailable or is insufficient. In various embodiments, the power controller 715 monitors power available to a collection of systems of the autonomous vehicle 100, with each system included in the set performing one or more actions comprising a minimal risk condition for the autonomous vehicle. As other examples, the collection of systems includes a steering system, a transmission, or other systems affecting movement of the autonomous vehicle 100. For example, the collection of systems includes a brake controller and a power braking system, so the power controller 715 directs power from the power storage unit 725 to the brake controller and to the power braking system via the control bus 1005 when less than a threshold amount of power is available to the brake controller and to the power braking system. Such a configuration allows the power controller 715 to provide power from the power storage unit 725 to systems of the autonomous vehicle 100 that perform actions comprising a minimal risk condition to safely bring the autonomous vehicle 100 to a stop. In embodiments where the power output of the power controller 715 is directed to one or more systems of the autonomous vehicle 100, the threshold voltage maintained by the power storage unit 725 accounts for power consumption requirements of the one or more systems of the autonomous vehicle 100. For example, the power storage unit 725 maintains a threshold voltage that is sufficient for at least one power domain 735A. 735B to provide instructions or signals for operating one or more autonomous vehicle control systems 223 or for operating one or more systems controlling movement of the autonomous vehicle 100 for a threshold amount of time and for the one or more systems to remain functional for at least the threshold amount of time. In various embodiments, the threshold amount of time is an amount of time for completion of a minimal risk condition, as further described above, stored by the autonomous vehicle 100.

In the embodiment shown by FIG. 10, the system 700 includes a domain controller 1010. The domain controller 1010 includes the switching logic to direct the power output to power domains 735A, 735B based on functionality provided by one or more microprocessors 730 included in different power domains 735A. 735B, allowing the domain controller 1010 to reroute the power output to different power domains 735A, 735B. For example, in response to the domain controller 1010 not receiving a signal from one or more microprocessors 730A (e.g., from at least a threshold number of microprocessors 730A) in the first power domain 735A, the domain controller 1010 reroutes the power output from the first power domain 735A to the second power domain 735B. Such rerouting increases the power routed to the second power domain 735B via the power output, allowing one or more microprocessors 730B in the second power domain 735B to provide signals or instructions to control one or more autonomous vehicle control systems 223 or other systems controlling movement of the autonomous vehicle 100. In other embodiments, the domain controller 1010 reroutes the power output from the first power domain 735A to the second power domain 735B in response to receiving a signal from the first power domain 735A.

In various embodiments, the domain controller 1010 monitors the first power domain 735A and the second power domain 735B and determines whether the first power domain 735A or the second power domain 735B is capable of providing instructions for the autonomous vehicle to complete the minimal risk condition, as further described above, using at least a collection of the autonomous vehicle control systems 223 that control movement of the autonomous vehicle 100 while the autonomous vehicle 100 is in an autonomous mode based on instructions provided by the first set of microprocessors 730A or by the second set of microprocessors 730B. In response to determining the first power domain 735A is not capable of providing instructions to at least the collection of autonomous vehicle control systems 223 to complete the minimal risk condition, the domain controller 1010 routes power from the first power domain 735A to the second power domain 735B. Similarly, in response to determining the second power domain 735B is not capable of providing instructions to at least the collection of autonomous vehicle control systems 223 to complete the minimal risk condition, the domain controller 1010 routes power from the second power domain 735B to the first power domain 735A. In various embodiments, the domain controller 1010 determines a power domain 735A, 735B is not capable of providing instructions for completing the minimal risk condition in response to determining the power domain 735A, 735B receives less than a threshold voltage from the power controller 715. For example, the domain controller 1010 determines the power domain 735A, 735B is not capable of providing instructions for completing the minimal risk condition in response to determining the power domain 735A, 735B receives zero volts. As another example, the domain controller 1010 determines the power domain 735A, 735B is not capable of providing instructions for completing the minimal risk condition in response to determining a threshold number of microprocessors 730 in the power domain 735A, 735B receive less than the threshold voltage or receive zero volts. This allows the domain controller 1010 to determine a power domain 735A, 735B is not capable of providing instructions for completing the minimal risk condition when one or more microprocessors 730 in the power domain 735A, 735B are disconnected from the power output of the power controller 715 or have a degraded connection to the power output of the power controller 715.

In various embodiments, output from a single power domain 735A. 735B is provided the collection of autonomous vehicle control systems 223. For example, instructions are output from a single power domain 735A, 735B to the collection of autonomous vehicle control systems 223, while other power domains 735A, 735B do not output instructions to the collection of autonomous vehicle control systems 223. This results the collection of autonomous vehicle control systems 223 receiving instructions from a single power domain 735A, 735B at a particular time, with other power domains 735A, 735B not providing instructions to the collection of autonomous vehicle control systems 223 at the particular time.

In various embodiments, when routing power from a power domain 735A, 735B to an alternative power domain 735A, 735B, the domain controller 1010 also transfers instructions for completing the minimal risk condition from the power domain 735A, 735B to the alternative power domain 735A, 735B. Such transfer of instructions from the power domain 735A, 735B to the alternative power domain 735A, 735B allows the alternative power domain 735A, 735B to begin executing the minimal risk condition form a point when the power domain 735A, 735B was executing the minimal risk condition. This reduces an amount of time for the alternative power domain 735A, 735B to begin providing instructions to the one or more autonomous vehicle control systems 223 when the domain controller 1010 transfers power form the power domain 735A, 735B to the alternative power domain 735. In other embodiments, microprocessors 730A, 730B in the alternative power domain 735A, 735B operate in a standby mode where they receive power and generate instructions based on inputs, but do not communicate the instructions from to the collection of autonomous vehicle control systems 223. When the domain controller 1010 routes power to the alternative power domain 735A, 735B, the microprocessors 730A. 730B of the alternative power domain 735A, 735B provide instructions to the autonomous vehicle control systems 223 in place of microprocessors 730A, 730B in the power domain 735A, 735B.

In some embodiments, the first power domain 735A includes a first steering control microprocessor, and the second power domain 735B includes a second steering control microprocessor. The first steering control microprocessor provides instructions to a steering control unit. Similarly, the second steering control microprocessor may provide instructions to the steering control unit. Based on an instruction from the first steering control microprocessor or from the second steering control microprocessor, the steering control unit performs a dynamic driving task without input from a driver of the autonomous vehicle 100. A dynamic driving task affects a direction or velocity of movement of the autonomous vehicle 100. For example, a dynamic driving task changes a direction of movement of the autonomous vehicle 100. As another example, the dynamic driving task maintains a current direction of movement of the autonomous vehicle 100. In various embodiments, the steering control unit receives instructions from the first steering control microprocessor via a steering instruction output of the first power domain 735A or from the second steering control microprocessor via a steering instruction output of the second power domain 735B, resulting in the steering control unit receiving instructions from a single steering control microprocessor.

The first power domain 735A has a domain selector input coupled to the domain controller 1010. Similarly, the second power domain 735B has a domain selector input coupled to the domain controller 1010. The domain selector input of a power domain 735A, 735B receives a signal or an instruction from the domain controller 1010 that specifies whether the power domain 735A, 735B provides instructions to an autonomous vehicle control system 223. For example, in response to receiving a first value via the domain selector input, a power domain 735A, 735B provides instructions to an autonomous vehicle control system 223, while in response to receiving a second value via the domain selector input, the power domain 735A. 735B does not provide instructions to the autonomous vehicle control system 223. In an example, the first steering control microprocessor provides instructions to the steering control unit through a steering control output of the first power domain 735A in response to the first power domain 735A receiving a first value from the domain controller 1010 through the domain selector input, while the second power domain 735B receives a second value from the domain controller 1010 through the domain selector input and does not provide steering instructions to the steering control unit through the steering instruction output of the second power domain 735B. This causes the domain controller 1010 to select one of the first power domain 735A or the second power domain 735B to transmit instructions to the steering control unit. As further described above, in various embodiments, the domain controller 1010 governs power transmission to the first power domain 735A and to the second power domain 735B. This allows the domain controller 1010 to route the power output from the power controller 715 to the first power domain 735A or to the second power domain 735B.

In some embodiments, the first power domain 735A and the second power domain 735B include additional microprocessors 730A, 730B, with outputs of a power domain 735A, 735B providing instructions from one or more additional microprocessors 730A, 730B to a corresponding autonomous vehicle control system 223 through an output. For example, the first power domain 735A includes a first velocity control microprocessor, and the second power domain 735B includes a second velocity control microprocessor. A braking control unit is coupled to a braking instruction output of the first power domain 735A. Similarly, the braking control unit is coupled to a braking instruction output of the second power domain 735B. The braking control unit modifies a velocity of the autonomous vehicle 100 without input from the driver in response to a braking instruction from a braking output of the first power domain 735A or a braking instruction from a braking output of the second power domain 735B. This allows a power domain 735A. 735B selected by the domain controller 1010 to provide instructions to the braking control unit to alter a velocity with which the autonomous vehicle 100 moves. Other microprocessors providing instructions to other autonomous vehicle control systems 223 are included in the first power domain 735A and in the second power domain 735B in other embodiments, allowing for various autonomous vehicle control systems 223 to receive instructions from corresponding outputs of a power domain 735A. 735B when the power domain 735A, 735B receives a domain selector input from the domain controller 1010 indicating that the power domain 735A, 735B has been selected to provide instructions to one or more autonomous vehicle control systems 223.

In some embodiments, the domain controller 1010 is also coupled to the driver notification system. In response to the domain controller 1010 determining a power domain 735A, 735B is not capable of providing instructions for the autonomous vehicle to complete a minimal risk condition using the collection of autonomous vehicle control systems 223, the driver notification system receives an instruction from the domain controller 1010. The driver notification system presents one or more notifications to the driver of the autonomous vehicle in response to receiving the instruction. Examples notifications presented to the driver include: displaying a warning light to the driver, displaying a message to the driver through a display, playing a specific sound to the driver through one or more speaker, and playing a message to the driver through one or more speakers. Other types of notifications may be presented to the driver by the driver notification system in various embodiments. Notifications may be continuously provided to the driver, provided to the driver at periodic intervals, or provided to the driver when the domain controller 1010 determines a power domain 735A. 735B is not capable of providing instructions to complete a minimal risk condition. This allows the driver to be alerted when a power domain 735A, 735B is not capable of providing instructions for the autonomous vehicle to complete a minimal risk condition.

In the embodiment shown by FIG. 10, one or more sensors 212 are coupled to the first power domain 735A and to the second power domain 735B. As further described above in conjunction with FIG. 2, the sensors are configured to capture sensor data describing the operational and environmental conditions of the autonomous vehicle 100. For example, the sensors 212 may include cameras (e.g., the cameras 102-114 of FIG. 1), accelerometers, Global Positioning System (GPS) radios, Lidar sensors, or other sensors. In various embodiments, coupling the sensors 212 to multiple power domains 735 allows the sensors 212 to receive power regardless of which power domain 735A. 735B receives the power output from the power controller 715. For example, coupling the sensors 212 to both the first power domain 735A and to the second power domain 735B prevents power to the sensors 212 from being interrupted when power is routed from the first power domain 735A to the second power domain 735B or vice versa. As the microprocessors 730A, 730B in a power domain 735A, 735B receive data from the sensors 212 that is used to generate instructions or control signals for the collection of autonomous vehicle control systems 223, preventing interruptions to power to the sensors 212 when routing power to a different power domain 735. In other embodiments, the one or more sensors 212 receive power from an alternative source than the power domains 735.

Figure 11:
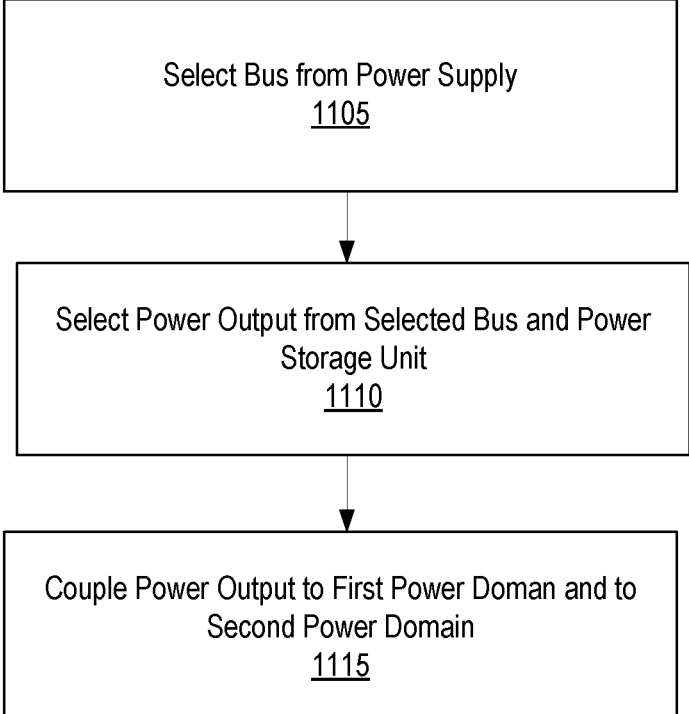
FIG. 11 is a flowchart of a method for redundantly supplying power to one or more computing devices according to some embodiments of the present disclosure.

For further illustration, FIG. 11 shows a flowchart of a method for redundantly supplying power to one or more computing devices according to some embodiments of the present disclosure. The method of FIG. 11 may be performed, for example, by the system 700 further described above in conjunction with FIGS. 7-9 in various embodiments.

The method shown in FIG. 11 includes selecting 1105 a bus 705 from a power supply 215. In various embodiments, a plurality of buses 705 are coupled to a power supply 215 and to a bus selector 710. Each bus 705 is independent of the other buses 705, with each bus 705 directing power from the power supply 215. The bus selector 710 selects 1105 a bus 705, with the selected bus 705 output from the bus selector 710. In various embodiments, the bus selector 710 selects 1105 a single bus 705 from a plurality of buses 705 coupled to the power supply 215 in various embodiments. As further described above in conjunction with FIG. 7, the bus selector 710 uses characteristics of power transmitted by different buses 705 to select 1005 a bus 705. For example, the bus selector 710 selects 1105 a bus 705 carrying a maximum voltage. As another example, the bus selector 710 selects a bus 705 having a maximum current. However, in other embodiments, the bus selector 710 may use any suitable characteristics or combination of characteristics of power carried by different buses 705 coupled to the power supply 215 to select 1005 a bus 705.

The method of FIG. 11 selects 1110 a power output as one of the selected bus 705 and a power storage unit 725. In some embodiments, a power controller 715 is coupled to the selected bus 705 and to the power storage unit 725. Based on characteristics of power carried by the selected bus 705, the power controller 715 selects the selected bus 705 of the power storage unit 725 as the power output. For example, an output of the bus selector 710 is coupled to the power controller 715 to couple the power controller 715 to the selected bus 705. Similarly, the power storage unit 725 is coupled to the power controller 715. In various embodiments, the power controller 715 selects 1110 between the selected bus 705 and the power storage unit 725 based on a voltage of the selected bus 705. In response to determining the voltage of the selected bus 705 is less than a threshold voltage, the power controller 715 selects 1110 the power storage unit 725 as the power output. However, in response to determining the voltage of the selected bus 705 equals or exceeds the threshold voltage, the power controller 715 selects 1110 the selected bus 705 as the power output. As further described above in conjunction with FIGS. 7-9, the threshold voltage is a voltage sufficient to operate one or more computing devices, or systems, that receive the power output selected 1110 by the power controller 715. In some embodiments, the threshold voltage is specified as a voltage sufficient to operate one or more computing devices for at least a threshold amount of time. As an example, the computing devices are included in an autonomous vehicle 100, and the threshold voltage is a voltage sufficient to operate the one or more computing devices for a length of time to have the autonomous vehicle 100 reach a complete stop. The threshold voltage is stored in a memory of the power controller 715 in various embodiments. Further, in other embodiments, the power controller 715 selects the power output based on other suitable characteristics of power routed along the selected bus 705, such as whether a current carried by the selected bus 705 equals or exceeds a threshold current.

Additionally, the power storage unit 725 is charged from power carried by the selected bus 705, allowing the power supply 215 to provide the power stored in the power storage unit 725. Such a configuration allows the power supply 215 to provide charge to the power storage unit 725, which accumulates power to act as an alternative power source if the power supply 215 is unable to provide at least a threshold amount of power (e.g., voltage). In some embodiments, the power controller 715 is configured to direct power from the selected bus 705 to the power storage unit 725 in response to the power controller 715 determining that less than a threshold voltage is stored in the power storage unit 725. As further described above, the threshold voltage stored in the power storage unit 725 is a voltage sufficient to operate at least one computing device coupled to an output of the power controller 715. For example, the threshold voltage stored in the power storage unit 725 is a voltage sufficient to operate at least one computing device coupled to an output of the power controller 715 for at least a threshold amount of time. In embodiments where multiple computing devices, or other systems (e.g., autonomous vehicle control systems 223) are included in a power domain that is coupled to an output of the power controller 715, the threshold voltage stored in the power storage unit 725 is a voltage sufficient to operate the power domain for at least a threshold amount of time.

In alternative embodiments, a charging system 720 couples the selected bus 705 to the power storage unit 725. The charging system 720 directs power from the selected bus 705 to the power storage unit 725 in response to the charging system 720 determining less than the threshold voltage is stored in the power storage unit 725. As further described above in conjunction with FIG. 7, in various embodiments, the power controller 715 or the charging system 720 accounts for other characteristics of the power storage unit 725 (e.g., a temperature of the power storage unit 725) when determining when to direct power from the selected bus 705 to the power storage unit 725.

The method shown by FIG. 11 couples 1115 the power output to a first power domain 735A and to a second power domain 735B. While FIG. 11 describes coupling 1115 the power output to the first power domain 735A and to the second power domain 735B, in other embodiments the power output is coupled 1115 to a different number of power domains 735. As the power output is selected 1110 based on a threshold voltage, the power output provides at least the threshold voltage to the first power domain 735A and to the second power domain 735B, allowing the method to prevent the voltage supplied to the first power domain 735A and to the second power domain 735B from falling below the threshold voltage for at least a threshold duration.

Figure 12:
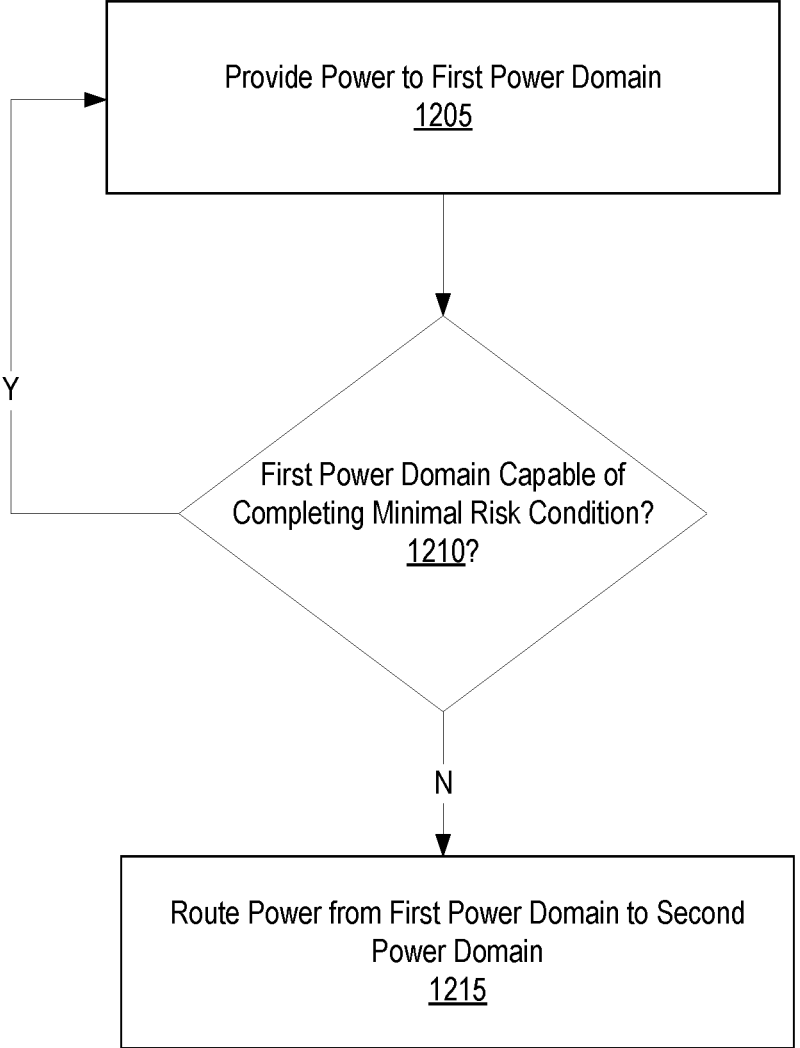
FIG. 12 is a flowchart of a method for redirecting power from a power domain to an alternative power domain according to some embodiments of the present disclosure.

For further illustration, FIG. 12 shows a flowchart of a method for redirecting power from a power domain 735A, 735B to an alternative power domain 735. The method of FIG. 12 may be performed, for example, by the domain controller 1010 further described above in conjunction with FIG. 10 in various embodiments. In other embodiments, different components, such as the power controller 715 or logic included in a power domain 735A, 735B performs the method described in conjunction with FIG. 12.

As further described above in conjunction with FIGS. 7-11, a system 700 provides 1205 power to a first power domain 735A of an autonomous vehicle 100. As further described above in conjunction with FIGS. 7-10, a power controller 715 provides a power output to the first power domain 735A. The power controller 715 selects the power output as a power storage unit 725 or an output of a bus selector 710, as further described above in conjunction with FIGS. 7-10. The first power domain 735A includes one or more microprocessors 730A, 730B, with the one or more microprocessors 730A. 730B coupled to one or more systems controlling movement of the autonomous vehicle 100. For example, the one or more systems are a collection of autonomous vehicle control systems 223, as further described above in conjunction with FIG. 10. Example systems controlling movement of the autonomous vehicle include: a braking system that activates brakes of the autonomous vehicle 100 at a time and with a force specified by a control signal from the microprocessor 730A, 730B, a transmission system of the autonomous vehicle 100 that changes a gear in which the autonomous vehicle 100 operates based on the received instructions, a steering system of the autonomous vehicle 100 that changes a direction of movement or an orientation of the autonomous vehicle 100 in based on the received instructions, Other systems may be included in the one or more systems in some embodiments. For example, one or more lighting systems are coupled to the first power domain 735A.

In some embodiments, when power is provided 1205 to the first power domain 735A, power is not provided to a second power domain 735B. In alternative embodiments, when power is provided 1205 to the first power domain 735A, power sufficient for one or more second microprocessors 730B in the second power domain 735B to operate in a standby mode is also provided to the second power domain 735B.

The domain controller 1010 determines 1210 whether one or more first microprocessors 730A in the first power domain 735A are able to provide instructions for the autonomous vehicle 100 to complete a minimal risk condition. As further described above in conjunction with FIG. 10, the minimal risk condition includes one or more actions to be performed for the autonomous vehicle 100 to be out of danger, as further described below. In some embodiments, the minimal risk condition specifies the autonomous vehicle 100 moving to an emergency lane or otherwise out of a lane including moving traffic and stopped. In other embodiments, the minimal risk condition specifies the autonomous vehicle 100 travels an off ramp and comes to a stop. As another example, a minimal risk condition specifies the autonomous vehicle 100 enters a lane for traffic moving at a slower speed. In another example, a minimal risk condition specifies the autonomous vehicle 100 perform autonomous control operations for a threshold amount of time to allow a driver to resume manual control of the autonomous vehicle 100. For another example, the minimal risk condition specifies the autonomous vehicle 100 come to a stop in a lane where the autonomous vehicle 100 is currently travelling. In other embodiments, the minimal risk condition specifies multiple actions for the autonomous vehicle to complete 100. For example, a minimal risk condition specifies the autonomous vehicle 100 complete a maneuver in progress, move to a different lane than a current lane, identify a location out of a flow of traffic (e.g., on a side of a road), come to a stop in the identified location, park, and turn on hazard lights. In different embodiments, different combinations of actions or actions are specified as the minimal risk condition; for example, different autonomous vehicles 100 store information identifying different vehicle-specific minimal risk conditions.

In response to determining 1210 one or more microprocessors 730A, 730B in the first power domain 735A are able to provide instructions for the autonomous vehicle 100 to complete the minimal risk condition, power remains provided 1205 to the first power domain 735A. The first power domain 735A continues to be provided 1205 with power while the first power domain 735A is able to provide instructions for the autonomous vehicle 100 to complete the minimal risk condition.

However, in response to determining 1210 one or more first microprocessors 730A in the first power domain 735A are unable to provide instructions for the autonomous vehicle 100 to complete the minimal risk condition, power is routed 1215 from the first power domain 735A to the second power domain 735B. The second power domain 735B includes one or more second microprocessors 730B that are also coupled to the one or more systems controlling movement of the autonomous vehicle 100. As further described above in conjunction with FIGS. 7 and 10, the second microprocessors 730B and the first microprocessors 730A are capable of generating instructions or control signals for the one or more systems controlling movement of the autonomous vehicle 100 to complete the minimal risk condition. This allows the first power domain 735A and the second power domain 735B to provide redundancy for completing the minimum risk condition. When a power domain 735A, 735B is unable to provide instructions for completing the minimum risk condition, power is rerouted 1215 from the power domain 735A, 735B to an alternative power domain 735A, 735B that is capable of completing the minimum risk condition, increasing safety for a driver of the autonomous vehicle 100.

In some embodiments, the one or more first microprocessors 730A in the first power domain 735A are unable to provide instructions for the autonomous vehicle 100 to complete the minimal risk condition if the first power domain 735A receives less than a threshold voltage. As another example, the one or more first microprocessors 730A in the first power domain 735A are unable to provide instructions for the autonomous vehicle 100 to complete the minimal risk condition if at least a threshold number of the one or more first microprocessors 730A receive less than a threshold voltage. For example, the one or more first microprocessors 730A in the first power domain 735A are unable to provide instructions for the autonomous vehicle 100 to complete the minimal risk condition if at least a threshold number of the one or more first microprocessors 730A receive zero volts. In another example, the one or more first microprocessors 730A in the first power domain 735A are unable to provide instructions for the autonomous vehicle 100 to complete the minimal risk condition in response to at least a threshold number of the one or more first microprocessors 730A being unable to generate an output signal.

In some embodiments, in response to determining 1210 the one or more first microprocessors 730A in the first power domain 735A are unable to provide instructions for the autonomous vehicle 100 to complete the minimal risk condition, one or more notifications are presented to a driver of the autonomous vehicle 100. For example, a driver notification system receives an instruction or a signal in response to a determination that the one or more first microprocessors 730A in the first power domain 735A are unable to provide instruction for the autonomous vehicle 100 to complete the minimal risk condition. The driver notification system presents one or more notifications to the driver of the autonomous vehicle in response to receiving the instruction or the signal. Example notifications presented to the driver include: displaying a warning light to the driver, displaying a message to the driver through a display, playing a specific sound to the driver through one or more speaker, and playing a message to the driver through one or more speakers. Other types of notifications may be presented to the driver by the driver notification system in various embodiments. Notifications may be continuously provided to the driver, provided to the driver at periodic intervals, or provided to the driver when the domain controller 1010 determines a power domain 735A. 735B is not capable of providing instructions to complete a minimal risk condition. This allows the driver to be alerted when a power domain 735A. 735B is not capable of providing instructions for the autonomous vehicle to complete a minimal risk condition.

In some embodiments, the system described above in conjunction with FIGS. 7-12 is included in an autonomous vehicle, with the microprocessors in the first power domain and in the second power domain providing control signals or instructions for autonomous vehicle control systems. The system described herein allows microprocessors in at least one power domain to remain operational via the power storage unit when a power supply of the autonomous vehicle is unable to power the microprocessors. When the micro-processors provide control signals or instructions to the autonomous vehicle control systems, the power storage unit maintains voltage sufficient for the autonomous vehicle control systems to complete a minimal risk condition for the autonomous vehicle. As further described above in conjunc-tion with FIG. 10, the minimal risk condition specifies one or more actions for the autonomous vehicle control systems to complete to safely bring the autonomous vehicle to a stop. Instructions specifying the actions for completing the mini-mal risk condition are stored in the autonomous vehicle in various embodiments. Further, microprocessors in different power domains provide redundant functionality, so if micro-processors in one power domain are inoperable, power is directed to another power domain whose microprocessors provide the functionality of the inoperable microprocessors. Additionally, the power storage unit maintains sufficient power to operate one or more systems of the autonomous vehicle that perform the actions specified by the autonomous vehicle, allowing the systems that perform the actions for the minimal risk condition to remain operational for completing the minimal risk condition. This autarchical power architec-ture for multiple power domains increases safety for pas-sengers in the autonomous vehicle by allowing the power storage unit to function as an alternative power supply for one or more control systems of the autonomous vehicle to complete a minimal risk condition, such as those further described above in conjunction with FIG. 10, for the autono-mous vehicle to navigate to a complete stop when the power supply is inoperative or is insufficiently operating. As further described above in conjunction with FIG. 10, the power storage unit provides power for operating one or more microprocessors in a power domain for a sufficient amount of time to provide instructions to one or more control systems to complete a minimal risk condition or provides power for operating the one or more microprocessors in the power domain and for operating one or more control sys-tems used to complete the minimal risk condition for a sufficient amount of time to complete the minimal risk condition. Further, the system described herein affords increased time for a driver of an autonomous vehicle to transition to manually driving the autonomous vehicle when power supply to the autonomous driving systems is inter-rupted, while other systems of the autonomous vehicle remain sufficiently powered.

In view of the explanations set forth above, a system including multiple buses coupled to a power supply as well as a power storage unit provides multiple levels of redun-dancy in providing power to microprocessors. As further described above in conjunction with FIGS. 7-11, the power storage unit accumulates power from the power supply. The accumulated power allows the power storage unit to act as an alternative power supply for one or more microprocessors when the power supply is unable to provide at least a threshold amount of power (e.g., voltage) to the one or more microprocessors. This system allows the first power domain and the second power domain to retain power autarchy from the power supply, enabling microprocessors in at least one of the first power domain and in the second power domain to continue to receive power when the power supply is unable to provide sufficient power. Further, having multiple buses coupled to the power supply allows selection of a bus providing a maximum amount of power from the power supply to the microprocessors. The power storage unit maintains at least a threshold voltage, with the threshold voltage sufficient to operate the microprocessors in at least one power domain for at least a threshold amount of time. This allows the microprocessors in at least one power domain to remain operational for at least the threshold amount of time in scenarios where the power supply is inactive or providing insufficient power to the microproces-sors.

Figure 13:
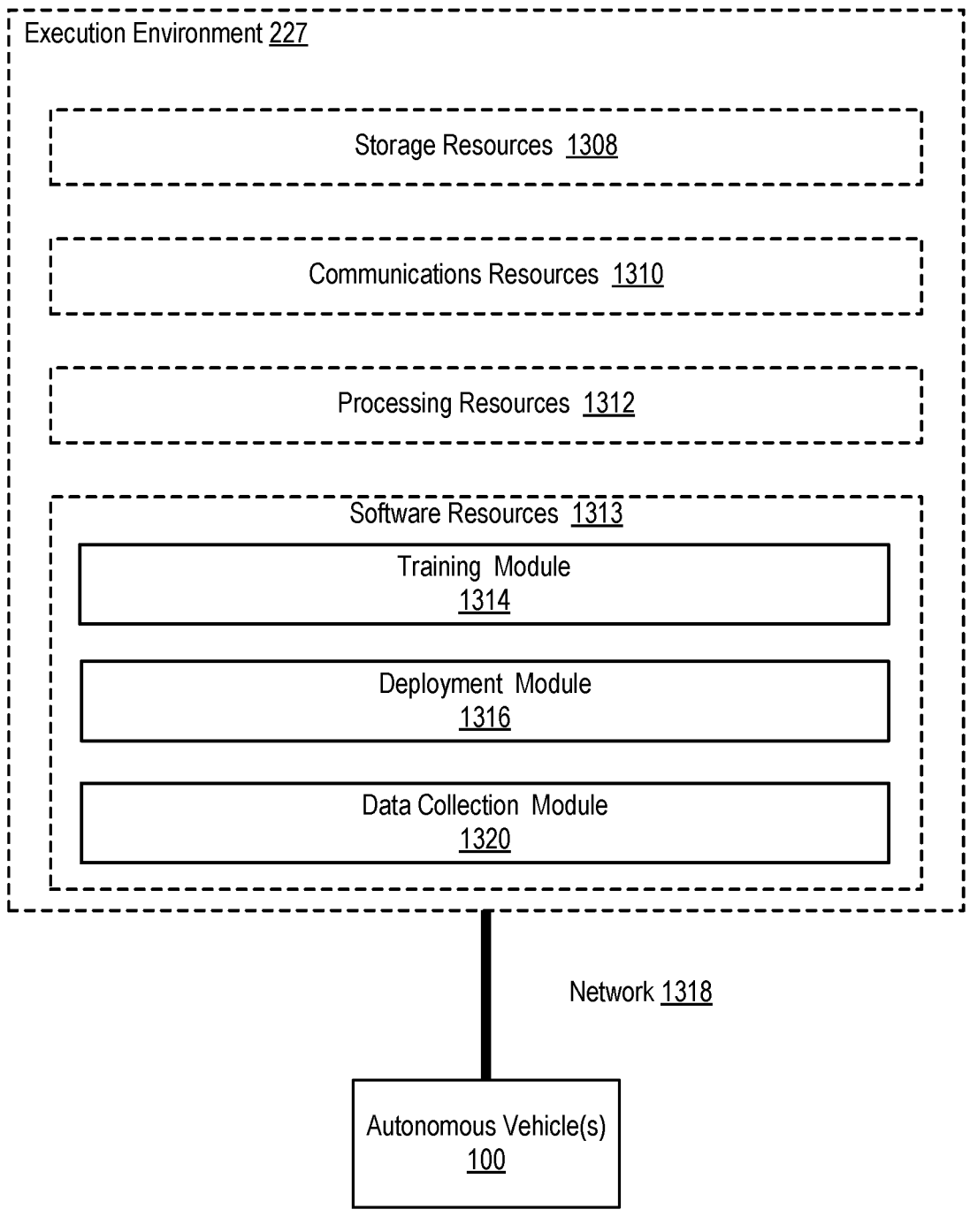
FIG. 13 is an example view of an execution environment for autonomous vehicle model training using low-discrepancy sequences according to some embodiments of the present disclosure.

For further explanation, FIG. 13 sets forth a diagram of an execution environment 227 in accordance with some embodiments of the present disclosure. The execution envi-ronment 227 depicted in FIG. 13 may be embodied in a variety of different ways. The execution environment 227 may be provided, for example, by one or more physical or virtual machine components consisting of bare-metal appli-cations, operating systems such as Android, Linux, Real-time Operating systems (RTOS), Automotive RTOS, such as AutoSAR, and others, including combinations thereof. The execution environment 227 may also be provided by cloud computing providers such as Amazon AWS™, Microsoft Azure™, Google Cloud™, and others, including combina-tions thereof. Alternatively, the execution environment 227 may be embodied as a collection of devices (e.g., servers, storage devices, networking devices) and software resources that are included in a computer or distributed computer or private data center. The execution environment 227 may be constructed in a variety of other ways and may even include resources within one or more autonomous vehicles or resources that communicate with one or more autonomous vehicles.

The execution environment 227 depicted in FIG. 13 may include storage resources 1308, which may be embodied in many forms. For example, the storage resources 1308 may include flash memory, hard disk drives, nano-RAM, 3D crosspoint non-volatile memory, MRAM, non-volatile phase-change memory (PCM), storage class memory (SCM), or many others, including combinations of the storage technologies described above. Other forms of com-puter memories and storage devices may be utilized as part of the execution environment 227, including DRAM, SRAM, EEPROM, universal memory, and many others. The storage resources 1308 may also be embodied, in embodi-ments where the execution environment 227 includes resources offered by a cloud provider, as cloud storage resources such as Amazon Elastic Block Storage (EBS) block storage, Amazon S3 object storage, Amazon Elastic File System (EFS) file storage, Azure Blob Storage, and many others. The example execution environment 227 depicted in FIG. 13 may implement a variety of storage architectures, such as block storage where data is stored in blocks, and each block essentially acts as an individual hard drive, object storage where data is managed as objects, or file storage in which data is stored in a hierarchical structure. Such data may be saved in files and folders and presented to both the system storing it and the system retrieving it in the same format.

The execution environment 227 depicted in FIG. 13 also includes communications resources 1310 that may be useful in facilitating data communications between components within the execution environment 227, as well as data communications between the execution environment 227 and computing devices that are outside of the execution environment 227. Such communications resources may be embodied, for example, as one or more routers, network switches, communications adapters, and many others, including combinations of such devices. The communications resources 1310 may be configured to utilize a variety of different protocols and data communication fabrics to facilitate data communications. For example, the communications resources 1310 may utilize Internet Protocol ('IP') based technologies, fibre channel (FC) technologies, FC over ethernet (FCOE) technologies, InfiniBand (IB) technologies, NVM Express (NVMe) technologies and NVMe over fabrics (NVMeoF) technologies, and many others. The communications resources 1310 may also be embodied, in embodiments where the execution environment 227 includes resources offered by a cloud provider, as networking tools and resources that enable secure connections to the cloud as well as tools and resources (e.g., network interfaces, routing tables, gateways) to configure networking resources in a virtual private cloud. Such communications resources may be useful in facilitating data communications between components within the execution environment 227, as well as data communications between the execution environment 227 and computing devices that are outside of the execution environment 227 (e.g., computing devices that are included within an autonomous vehicle 100).

The execution environment 227 depicted in FIG. 13 also includes processing resources 1312 that may be useful in useful in executing computer program instructions and performing other computational tasks within the execution environment 227. The processing resources 1312 may include one or more application-specific integrated circuits (ASICs) that are customized for some particular purpose, one or more central processing units (CPUs), one or more digital signal processors (DSPs), one or more field-programmable gate arrays (FPGAs), one or more systems on a chip (SoCs), or other form of processing resources 1312. The processing resources 1312 may also be embodied, in embodiments where the execution environment 227 includes resources offered by a cloud provider, as cloud computing resources such as one or more Amazon Elastic Compute Cloud (EC2) instances, event-driven compute resources such as AWS Lambdas, Azure Virtual Machines, or many others.

The execution environment 227 depicted in FIG. 13 also includes software resources 1313 that, when executed by processing resources 1312 within the execution environment 227, may perform various tasks. The software resources 1313 may include, for example, one or more modules of computer program instructions that when executed by processing resources 1312 within the execution environment 227 are useful in training neural networks configured to determine control autonomous vehicle control operations. For example, a training module 1314 may train a neural network using training data including sensor 212 data and control operations recorded or captured contemporaneous to the training data. In other words, the neural network may be trained to encode a relationship between an environment relative to an autonomous vehicle 100 as indicated in sensor 212 data and the corresponding control operations effected by a user or operation of the autonomous vehicle. The training module 1314 may provide a corpus of training data, or a selected subset of training data, to train the neural network. For example, the training module 1314 may select particular subsets of training data associated with particular driving conditions, environment states, etc. to train the neural network.

The software resources 1313 may include, for example, one or more modules of computer program instructions that when executed by processing resources 1312 within the execution environment 227 are useful in deploying software resources or other data to autonomous vehicles 100 via a network 1318. For example, a deployment module 1316 may provide software updates, neural network updates, or other data to autonomous vehicles 100 to facilitate autonomous vehicle control operations.

The software resources 1313 may include, for example, one or more modules of computer program instructions that when executed by processing resources 1312 within the execution environment 227 are useful in collecting data from autonomous vehicles 100 via a network 1318. For example, a data collection module 1320 may receive, from autonomous vehicles 100, collected sensor 212, associated control operations, software performance logs, or other data. Such data may facilitate training of neural networks via the training module 1314 or stored using storage resources 1308.

Exemplary embodiments of the present disclosure are described largely in the context of a fully functional computer system for an autonomous vehicle 100. The present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others. Any computer system having suitable programming means will be capable of executing the steps of the method of the disclosure as embodied in a computer program product. Although some of the exemplary embodiments described in this specification are oriented to software installed and executing on computer hardware, nevertheless, alternative embodiments implemented as firmware or as hardware are well within the scope of the present disclosure.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood that any of the functionality or approaches set forth herein may be facilitated at least in part by artificial intelligence applications, including machine learning applications, big data analytics applications, deep learning, and other techniques. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A system comprising: a power supply; a plurality of buses coupled to the power supply; a bus selector coupled to an output of each of the plurality of buses; a power storage unit separate from the power supply, the power storage unit coupled to an output of the power supply via a selection by the bus selector and configured to store power received from the power supply; a power controller coupled to an output of the bus selector and to the power storage unit and configured to route power from a first power domain to a second power domain based on a threshold voltage; and a charging system configured to provide power from an output of the bus selector, coupled to the output of each of the plurality of buses, to the power storage unit.

2. The system of claim 1, wherein the power controller selects a power output as the power storage unit in response to determining a voltage of the output of the bus selector is less than the threshold voltage.

3. The system of claim 2, wherein the power controller selects the power output as the power storage unit in response to determining the voltage of the output of the bus selector is zero volts.

4. The system of claim 1, wherein the power controller selects a power output as the output of the bus selector in response to determining a voltage of the output of the bus selector is at least the threshold voltage.

5. The system of claim 1, wherein the bus selector selects a bus of the plurality of buses having a highest voltage.

6. The system of claim 1, further comprising: the first power domain including one or more computing devices, the first power domain coupled to a power output of the power controller; and the second power domain including one or more computing devices, the second power domain coupled to the power output of the power controller.

7. The system of claim 6, wherein the first power domain comprises a first microprocessor coupled to a braking electronic control unit of a vehicle and the second power domain comprises a second microprocessor coupled to the braking electronic control unit of the vehicle.

8. The system of claim 6, wherein the one or more computing devices of the first power domain include one or more processors configured to execute instructions stored in a memory coupled to the one or more processors.

9. The system of claim 8, wherein the one or more computing devices of the second power domain include one or more additional processors configured to execute the instructions stored in an additional memory coupled to the one or more additional processors.

10. The system of claim 9, wherein the instructions stored in the additional memory provide a common functionality as provided by the instructions stored in the memory.

11. The system of claim 1, wherein the power storage unit comprises a battery.

12. The system of claim 1, wherein the power storage unit comprises a capacitor.

13. The system of claim 1, further comprising:
a charging system coupled to the output of the bus selector and to the power storage unit, the charging system configured to charge the power storage unit using the output of the bus selector.

14. An autonomous vehicle comprising:
a bus selector configured to select a bus coupled to a power supply as an output;
a power storage unit separate from the power supply, the power storage unit configured to store power received from the power supply via a selection by the bus selector;
a power controller coupled to the output of the bus selector and to the power storage unit, the power controller selecting a power output as one of the output of the bus selector and the power storage unit based on the output of the bus selector;
a first power domain coupled to the power output of the power controller, the first power domain including a microprocessor coupled to at least a collection of autonomous vehicle control systems;
a second power domain coupled to the power output of the power controller, the second power domain including one or more microprocessors coupled to at least the collection of autonomous vehicle control systems; and
a domain controller configured to route power from the first power domain to the second power domain based on a threshold voltage.

15. The autonomous vehicle of claim 14, further comprising:
the power supply; and
a plurality of buses each coupled to the power supply and to the bus selector.

16. The autonomous vehicle of claim 15, wherein the power supply comprises a battery.

17. The autonomous vehicle of claim 15, wherein the power supply comprises an alternator driven by an engine included in the autonomous vehicle.

18. The autonomous vehicle of claim 14, wherein the power controller selects the power storage unit in response to determining a voltage of the output of the bus selector is less than the threshold voltage.

19. The autonomous vehicle of claim 18, wherein the power controller selects the power storage unit in response to determining the voltage of the output of the bus selector is less than the threshold voltage and in response to receiving an indication the autonomous vehicle has an operational fault.

20. The autonomous vehicle of claim 14, wherein the power controller directs power from the output of the bus selector to the power storage unit in response to determining less than the threshold voltage is stored in the power storage unit.

21. The autonomous vehicle of claim 20, wherein the threshold voltage is at least a voltage sufficient to operate at least one of the first power domain and the second power domain.

22. The autonomous vehicle of claim 20, wherein the threshold voltage is at least a voltage sufficient to operate at least one of the first power domain and the second power domain for a threshold amount of time.

23. The autonomous vehicle of claim 14, wherein the power controller is configured to select the output of the bus selector in response to determining a voltage of the bus selector is at least the threshold voltage.

24. The autonomous vehicle of claim 14, wherein the bus selector is configured to select a bus having a highest voltage.

25. The autonomous vehicle of claim 14, further comprising:
one or more autonomous vehicle control systems coupled to the first power domain and to the second power domain.

26. The autonomous vehicle of claim 25, wherein the one or more autonomous vehicle control systems include a system configured to change a rate of speed of the autonomous vehicle.

27. The autonomous vehicle of claim 25, wherein the one or more autonomous vehicle control systems include a system configured to change application of one or more brakes of the autonomous vehicle.

28. The autonomous vehicle of claim 25, wherein the one or more autonomous vehicle control systems include a system configured to change a gear in which the autonomous vehicle operates.

29. The autonomous vehicle of claim 25, wherein the one or more autonomous vehicle control systems include a system configured to change an orientation of the autonomous vehicle.

30. The autonomous vehicle of claim 14, further comprising:
a control bus coupled to one or more control systems configured to control movement of the autonomous vehicle, the control bus providing power to the one or more control systems, wherein:

the power controller is further coupled to the control bus, the power controller configured to couple the power storage unit to the control bus in response to determining less than a threshold voltage is present on the control bus.

31. The autonomous vehicle of claim 14, further comprising:

a charging system coupled to the power output of the power controller and to the power storage unit, the charging system configured to charge the power storage unit using the power output of the power controller.

32. The autonomous vehicle of claim 14, wherein the power storage unit comprises a battery.

33. The autonomous vehicle of claim 14, wherein the power storage unit comprises a capacitor.

34. The autonomous vehicle of claim 14, wherein the first power domain receives power from the power output of the power controller sufficient for the one or more microprocessors in the first power domain to operate with full functionality and the second power domain receives power from the power output of the power controller sufficient for the one or more microprocessors in the second power domain to operate in a standby mode.

35. The autonomous vehicle of claim 34, wherein the first power domain further includes switching logic configured to route the power from the power output of the power controller to the second power domain in response to the one or more microprocessors in the first power domain providing less than a threshold amount of functionality.

36. The autonomous vehicle of claim 35, wherein the one or more microprocessors in the first power domain provide less than the threshold amount of functionality when at least a threshold number of microprocessors in the first power domain are inoperative.

37. The autonomous vehicle of claim 34, wherein the power controller further includes switching logic configured to route the power from the power output of the power controller to the second power domain in response to the one or more microprocessors in the first power domain providing less than a threshold amount of functionality.

38. The autonomous vehicle of claim 14, wherein the first power domain receives power from the power output of the power controller sufficient for the one or more microprocessors in the first power domain to operate with full functionality and the second power domain does not receive power from the power output of the power controller sufficient for the one or more microprocessors in the second power domain.

39. The autonomous vehicle of claim 38, wherein the first power domain further includes switching logic configured to route the power from the power output of the power controller to the second power domain in response to the one or more microprocessors in the first power domain providing less than a threshold amount of functionality.

40. The autonomous vehicle of claim 39, wherein the one or more microprocessors in the first power domain provide less than the threshold amount of functionality when at least a threshold number of microprocessors in the first power domain are inoperative.

41. The autonomous vehicle of claim 38, wherein the power controller further includes switching logic configured to route the power from the power output of the power controller to the second power domain in response to the one or more microprocessors in the first power domain providing less than a threshold amount of functionality.

* * * * *